(12) United States Patent
Ishigami et al.

(10) Patent No.: US 8,085,298 B2
(45) Date of Patent: Dec. 27, 2011

(54) CAMERA CONTROL DEVICE

(75) Inventors: Tomohide Ishigami, Tokyo (JP);
Kensuke Maruya, Kanagawa (JP);
Susumu Okada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1376 days.

(21) Appl. No.: 11/571,764

(22) PCT Filed: Jul. 6, 2005

(86) PCT No.: PCT/JP2005/012466
§ 371 (c)(1),
(2), (4) Date: Jan. 8, 2007

(87) PCT Pub. No.: WO2006/006465
PCT Pub. Date: Jan. 19, 2006

(65) Prior Publication Data
US 2008/0186379 A1 Aug. 7, 2008

(30) Foreign Application Priority Data

Jul. 12, 2004 (JP) ................................. 2004-205157
Jun. 28, 2005 (JP) ................................. 2005-189008

(51) Int. Cl.
*H04N 7/18* (2006.01)
*G06F 12/00* (2006.01)
(52) U.S. Cl. ......................................... 348/116; 348/47
(58) Field of Classification Search .................. 709/116, 709/211.11, 207.99, 208.4, 211.99; 348/47–48, 348/116, 211.11, 207.99, 208.4, 211.99
See application file for complete search history.

(56) References Cited

U.S. PATENT DOCUMENTS

| 4,992,866 | A | 2/1991 | Morgan | |
|---|---|---|---|---|
| 6,101,536 | A * | 8/2000 | Kotani et al. | 709/217 |
| 6,909,458 | B1 * | 6/2005 | Suzuki et al. | 348/211.8 |
| 2001/0040636 | A1 * | 11/2001 | Kato et al. | 348/333.03 |
| 2002/0069265 | A1 * | 6/2002 | Bountour et al. | 709/219 |
| 2003/0214582 | A1 | 11/2003 | Takahashi et al. | |
| 2007/0094698 | A1 * | 4/2007 | Bountour et al. | 725/132 |

FOREIGN PATENT DOCUMENTS

| EP | 0690628 | 1/1996 |
|---|---|---|
| JP | 06-096378 | 4/1994 |
| JP | 2001-136515 | 5/2001 |
| JP | 2003-288005 | 10/2003 |
| JP | 2003-329462 | 11/2003 |
| JP | 2004-096794 | 3/2004 |

(Continued)

OTHER PUBLICATIONS

English language Abstract of JP 2001-136515.

(Continued)

*Primary Examiner* — Zarni Maung
(74) *Attorney, Agent, or Firm* — Greenblum & Bernstein, P.L.C.

(57) ABSTRACT

A camera control device capable of easily performing control even if more than one camera is provided. A common operation section performs a map operation and a camera operation with the same operation device. An operation management section switches between the map operation and the camera operation depending on the scale (display magnification) of a map and the imaging magnification of a camera to be operated. To perform the map operation, the operation management section sends an operation signal to a map control section, and to perform the camera operation, it sends an operation signal to a camera control section.

15 Claims, 20 Drawing Sheets

FOREIGN PATENT DOCUMENTS

WO   97/023096   6/1997

OTHER PUBLICATIONS

U.S. Appl. No. 10/599,195 to Maruya, which was filed Sep. 22, 2006.

Zhang et al., "The Design and Development of Electric Map in Video Surveillance System" (in Chinese), Computer Engineering and Application, 2004.19, pp. 107-110, along with an English language translation of sections 2-2.3.

Wei, "Brief Introduction of Multi-medium Remote Monitoring System of Dongfeng Power Plant" (in Chinese), Guizhou Water Power, vol. 15, No. 2, pp. 78-81, Jun. 2001, along with a English language translation of section 3.4.2.

Zhang et al., "The Design and Development of Electric Map in Video Surveillance System" (in Chinese, with an English language title and an English language Abstract), Computer Engineering and Application, 2004.19, pp. 107-110, and an English language translation of sections 2-2.3.

Wei, "Brief Introduction of Multi-media Remote Monitoring System of Dongfeng Power Plant" (in Chinese), Guizhou Water Power, vol. 15, No. 2, pp. 78-81, Jun. 2001, and an English language translation of section 3.4.2.

Zhang et al., "The Design and Development of Electric Map in Video Surveillance System" (in Chinese, with an English language title and an English language Abstract), Computer Engineering and Application, 2004.19, pp. 107-110.

Wei, "Dongfeng Power Plant Multimedia Remote Monitoring and Surveillance System" (in Chinese), Guizhou Water Power, vol. 15, No. 2, pp. 78-81, Jun. 2001.

Search report from E.P.O. that issued with respect to patent family member European Patent Application No. 05757805.6, mail date is Sep. 12, 2011.

* cited by examiner

| CONDITION FOR CHANGING FROM THE MAP OPERATION MODE TO CAMERA OPERATION MODE | CONDITION FOR CHANGING FROM THE CAMERA OPERATION MODE TO MAP OPERATION MODE |
|---|---|
| SCALE OF THE MAP $\frac{1}{000}$ >A | SHOOTING MAGNIFICATION <1 |

| THE NUMBER OF CAMERA ICONS | THRESHOLD FOR THE SCALE OF THE MAP |
|---|---|
| 1 | 1/a |
| 2 | 1/10a |
| 3 | 1/20a |

FIG.11

CAMERA CONTROL DEVICE

TECHNICAL FIELD

The present invention relates to a camera control device such as a surveillance device, car navigation and the like, and more particularly, to a camera control device which selects an operation target camera from a map indicating installation positions of a plurality of cameras and varies a shooting direction, shooting magnification, and the like.

BACKGROUND ART

As a conventional camera control device, a surveillance device comprised of a single camera is generally operated using a console. More specifically, an operation lever provided on the console is moved from side to side and up and down, the shooting direction of the camera is thereby controlled from side to side and up and down, and a zoom/wide button similarly provided on the console is pushed to vary the shooting magnification.

In recent years, as a wide-area surveillance device comprised of a plurality of cameras, surveillance devices have appeared which have a graphical user interface (GUI) enabling easy management of the cameras.

The GUI for placing graphics representing installations of cameras on a map and displaying it in association with shot images has an advantage of enabling a user to control a surveillance device easily without the need of specific knowledge.

For example, Patent Document 1 describes a surveillance device which has the GUI, selects an operation target camera from a plurality of cameras by operation of a mouse, and operates the camera by operation of the console. The operation method of the conventional surveillance device as described in Patent Document 1 will briefly be described below with reference to FIG. 1.

FIG. 1 is a diagram showing a configuration example of the conventional surveillance device. The surveillance device has display screen 1, mouse 3 used in selecting an operation target camera, and console 5 used in operating the operation target camera. Display screen 1 has display window 10 that displays an image shot by a camera, and map window 20 that indicates a 2C shooting position of the camera.

When an operation target camera is selected from a plurality of (herein, three) cameras, among camera icons 22, 24 and 26 representing installation positions of the cameras displayed in map window 20, a camera icon to operate (for example, camera icon 22) undergoes operation 30 (so-called drag and drop) of dragging and dropping the icon onto one (for example, image display area 16) of image display areas 12, 14, 16 and 18 in image window 10. By this means, an image shot by the camera represented by camera icon 22 is displayed in image display area 16 that is a destination of the drag and drop operation. Such operation enables display of an image shot by any one of the cameras.

Further, when performing camera operation, by single-clicking image display area 16 displaying an image shot by the operation target camera, the operation target camera can be selected, and further, by operating console 5, it is possible to vary the shooting direction and shooting magnification of the operation target camera.

[Patent Document 1] Japanese Laid-Open Patent Publication No. 2001-136515 (pages 5-6, FIG. 5)

DISCLOSURE OF INVENTION

Problems to be Solved by the Invention

However, in the surveillance device as described in Patent Document 1 as the conventional camera control device, different operation means are used between map operation for selecting an operation target camera from a plurality of cameras by operation of mouse 3 and camera operation for varying the shooting direction and shooting magnification of the operation target camera by operation of console 5. Therefore, whenever switching between the map operation and camera operation, it is necessary to shift the hand between mouse 3 and console 5, and there is a problem that the operation is complicated.

It is an object of the invention to provide a camera control device capable of operating a plurality of cameras with ease.

Means for Solving the Problem

A camera control device of the invention has a plurality of cameras, a camera controller that controls the cameras and transfers image data from the cameras, a map controller that controls and transmits map data indicating installation positions of the cameras, an operation manager that switches between camera operation for instructing operation conditions of the cameras and map operation for instructing a display condition of the map data, a common operator that performs the map operation and camera operation, and a display that displays the image data transmitted from the camera controller and the map data transmitted from the map controller.

ADVANTAGEOUS EFFECT OF THE INVENTION

According to the invention, it is possible to easily control even a plurality of cameras.

BRIEF DESCRIPTION OF DRAWINGS

FIG. 11 is a diagram illustrating an example of the switching condition corresponding to a scale of the map and shooting magnification of an operation target camera;

BEST MODE FOR CARRYING OUT THE INVENTION

Embodiments of the invention will specifically be described below with reference to accompanying drawings. In addition, the invention is not limited to the Embodiments described below, and is capable of being carried into practice with various aspects without departing from the scope of the subject matter.

Embodiment 1

This Embodiment describes a method of performing map operation and camera operation using the same operation means. In addition, this Embodiment describes about application to a surveillance device as an example of a camera control device.

Figure 1:
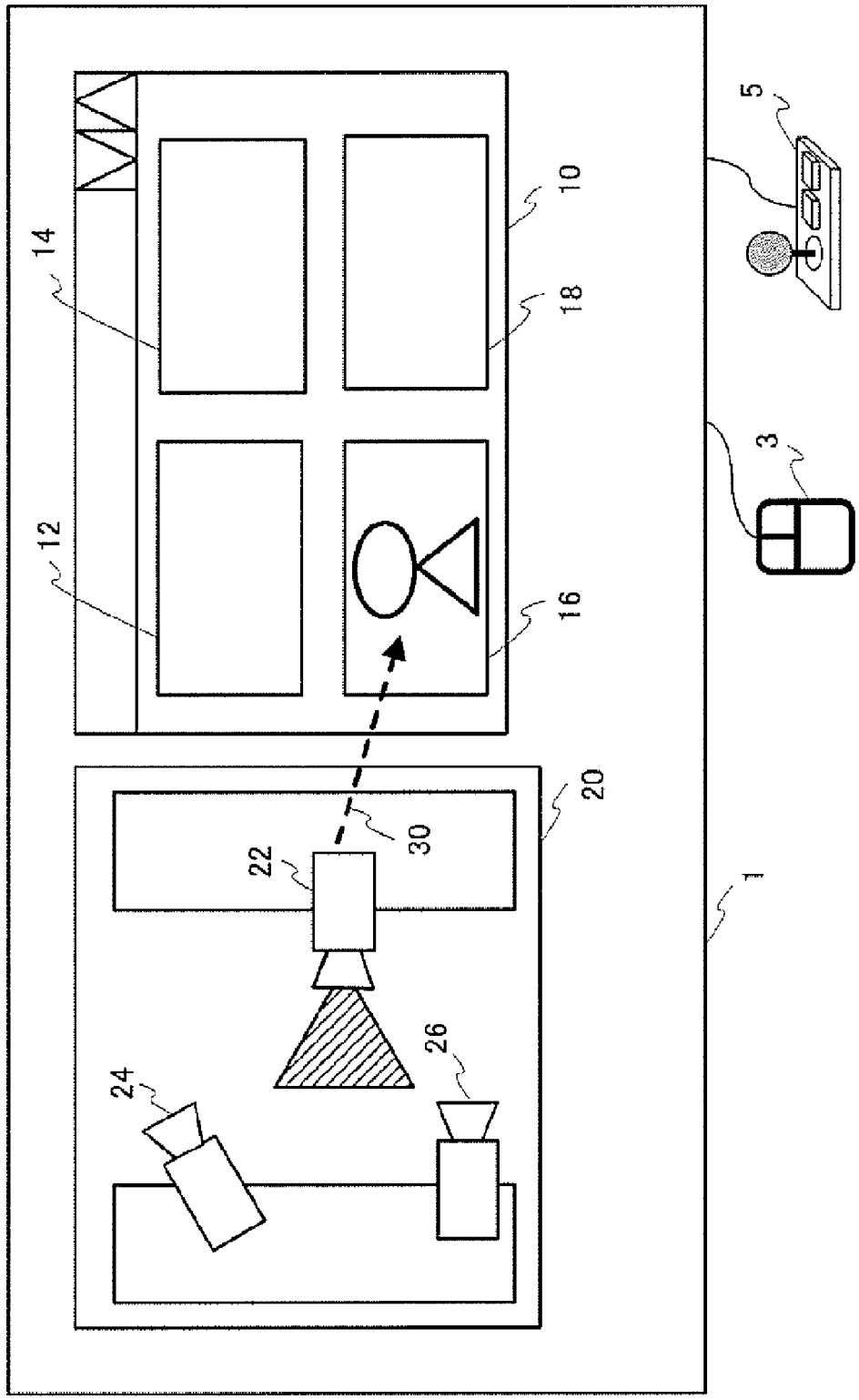
FIG. 1 is a diagram showing a configuration example of a conventional surveillance device.
Figure 2:
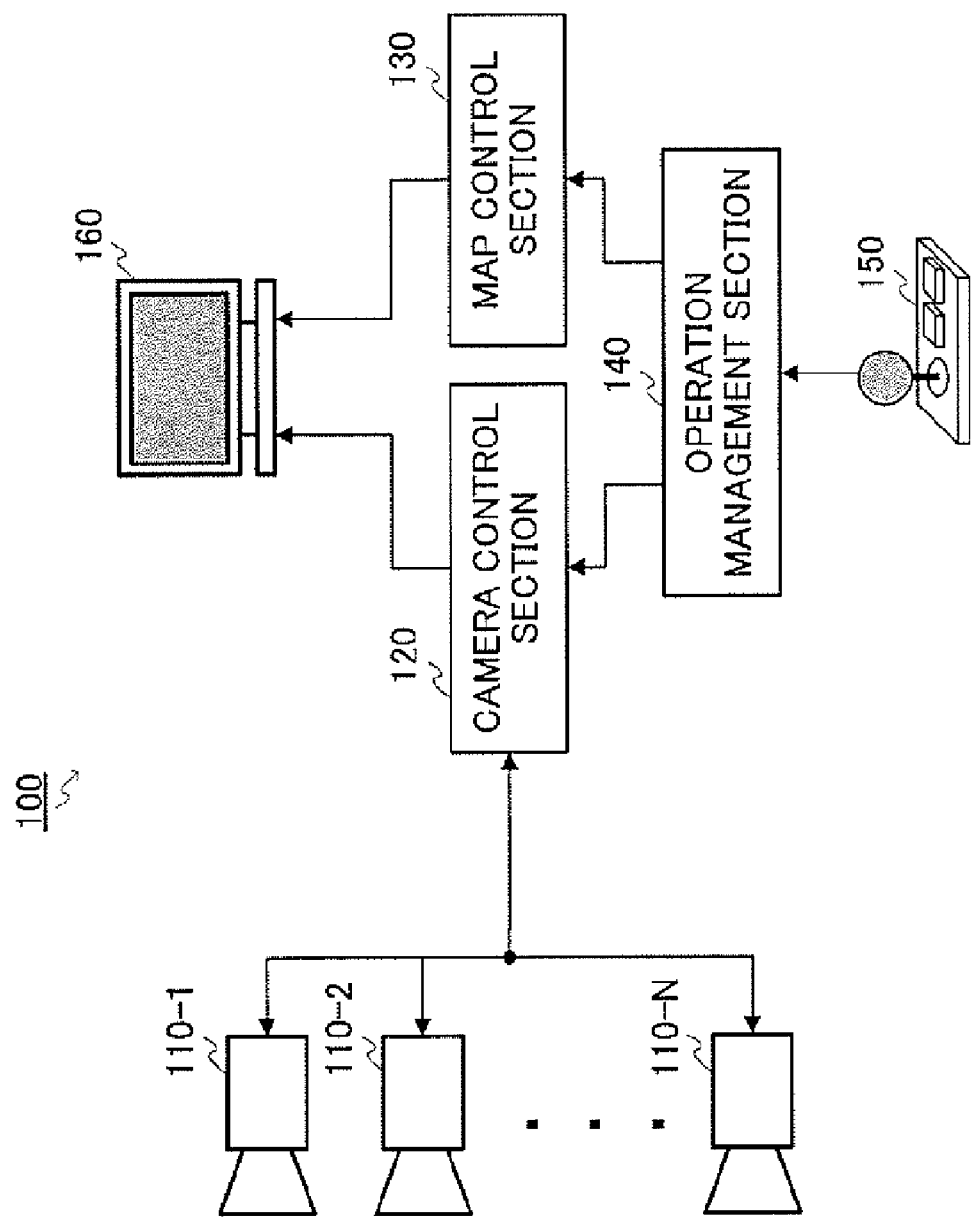
FIG. 2 is a diagram illustrating a configuration of a camera control device according to Embodiment 1 of the invention.

FIG. 2 is a diagram illustrating a configuration of a camera control device (surveillance device) according to Embodiment 1 of the invention. Surveillance device 100 as shown in FIG. 2 has a plurality of (for example, N) surveillance cameras (hereinafter, simply referred to as "cameras") 110-1, 110-2, . . . , 110-N, camera control section 120 that performs entire control of cameras 110-1 to 110-N, map control section 130 that controls map data, operation management section 140 that switches between the map operation and camera operation, common operation section 150 that instructs the map operation and camera operation using the same operation means, and display device 160.

It is possible to vary the shooting direction and shooting magnification of each of cameras 110-1 to 110-N according to a camera control signal from camera control section 120. According to a signal from operation management section 140, camera control section 120 generates a camera control signal for changing the shooting direction and shooting magnification of one of cameras 110-1 to 110-N to transmit to the corresponding camera. Further, camera control section 120 transmits image data shot by cameras 110-1 to 110-N to display device 160.

According to a signal from operation management section 140, map control section 130 controls display positions and display magnifications or map data managed therein, and transmits map data indicating a target place (an installation place of a camera) to display device 160.

Common operation section 150 is a user interface for operation management section 140 to recognize the content of the camera operation and map operation that a user intends to perform. In other words, common operation section 150 transmits to operation management section 140 an operation signal corresponding to the content of the camera operation and map operation that a user intends to perform.

Display device 160 displays the map data from map control section 130 and the image data from camera control section 120 on the screen.

Operation management section 140 switches between the map operation and the camera operation to perform, according to a predetermined condition, for example, corresponding to a scale (display magnification) of the map and the shooting magnification of an operation target camera. Operation management section 140 transmits an operation signal to map control section 130 when the map operation is performed, or to camera control section 120 when the camera operation is performed.

Figure 3:
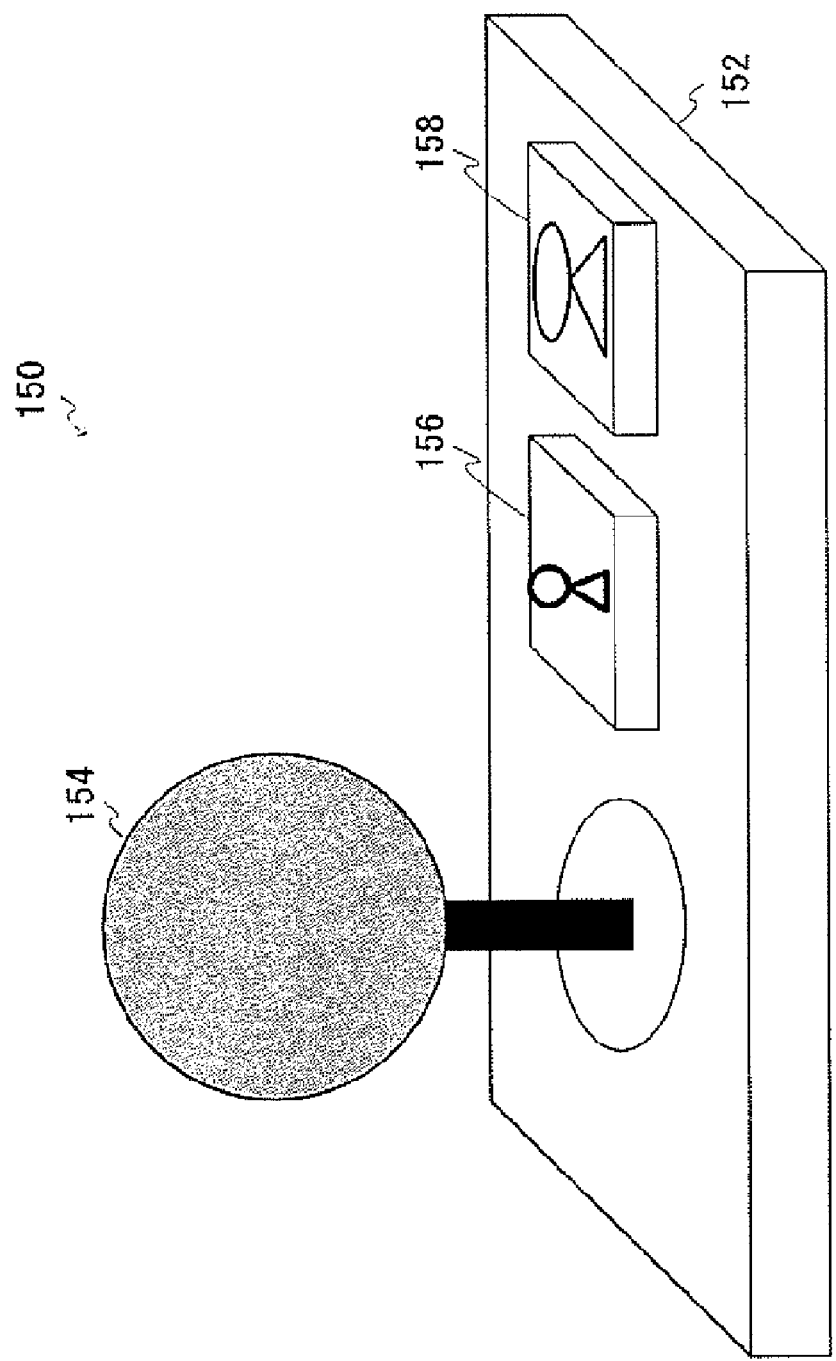
FIG. 3 is a diagram showing a configuration example of a common operation section.

FIG. 3 is a diagram showing a configuration example of common operation section 150. Console 152 constituting common operation section 150 has operation lever 154 that instructs the direction, and wide button 156/zoom button 158 that change the scale of a map and the shooting magnification of an operation target camera.

In addition, in this Embodiment, common operation section 150 is configured by hardware such as operation lever 154, and buttons 156 and 158, but the invention is not limited to the above-mentioned configuration. For example, common operation section 150 may be configured by software of speech recognition and the like.

Figure 4:
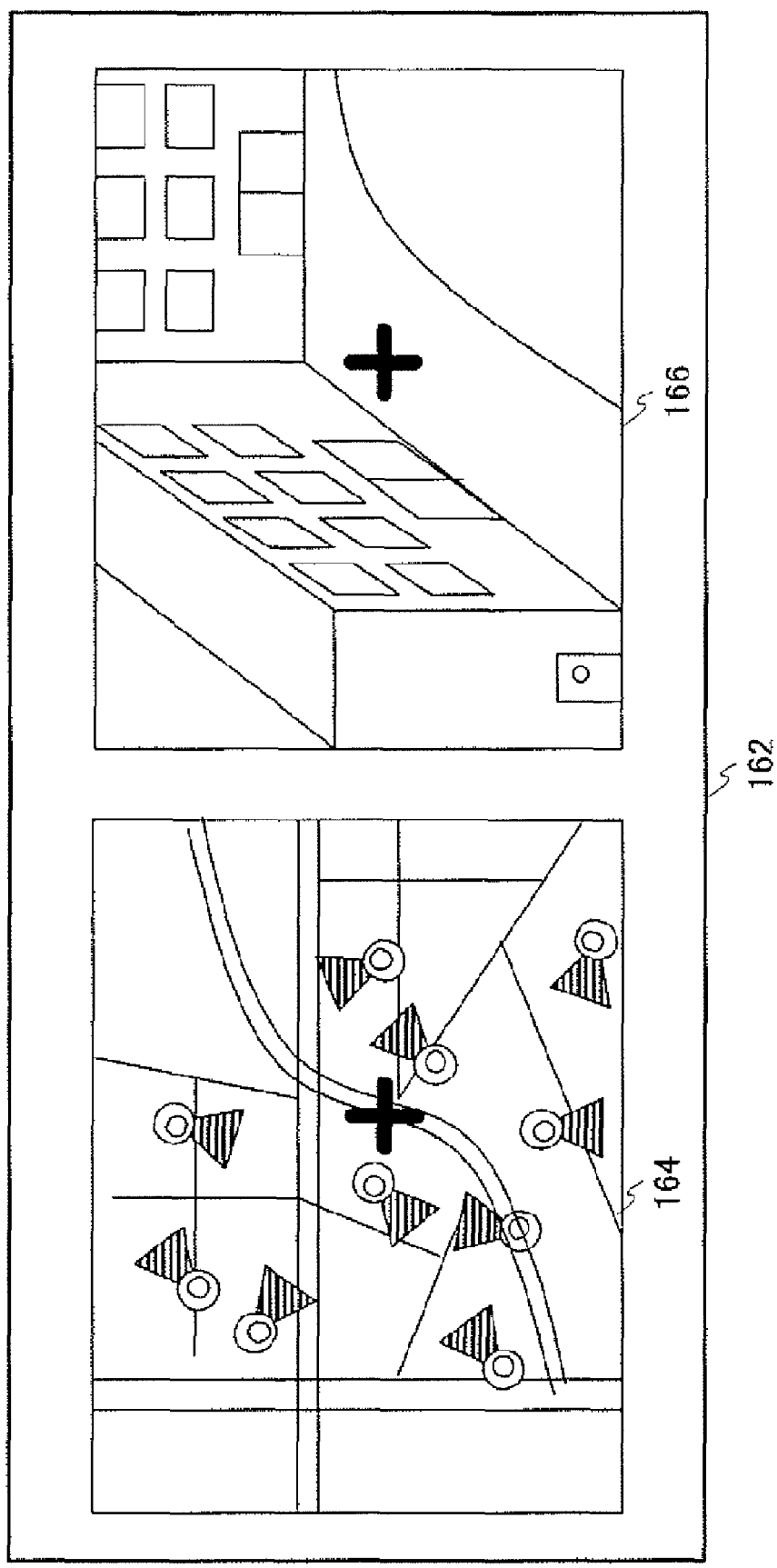
FIG. 4 is a diagram illustrating a configuration example of a screen in a display device.

FIG. 4 is a diagram illustrating a configuration example of a screen in display device 160. Display screen 162 of display device 160 has map window 164 to display the map data, and image window 166 to display the image data shot by the operation target camera.

The operation of operation management section 140 will specifically be described below with reference to FIGS. 5 and 6.

Figures 5, 6:
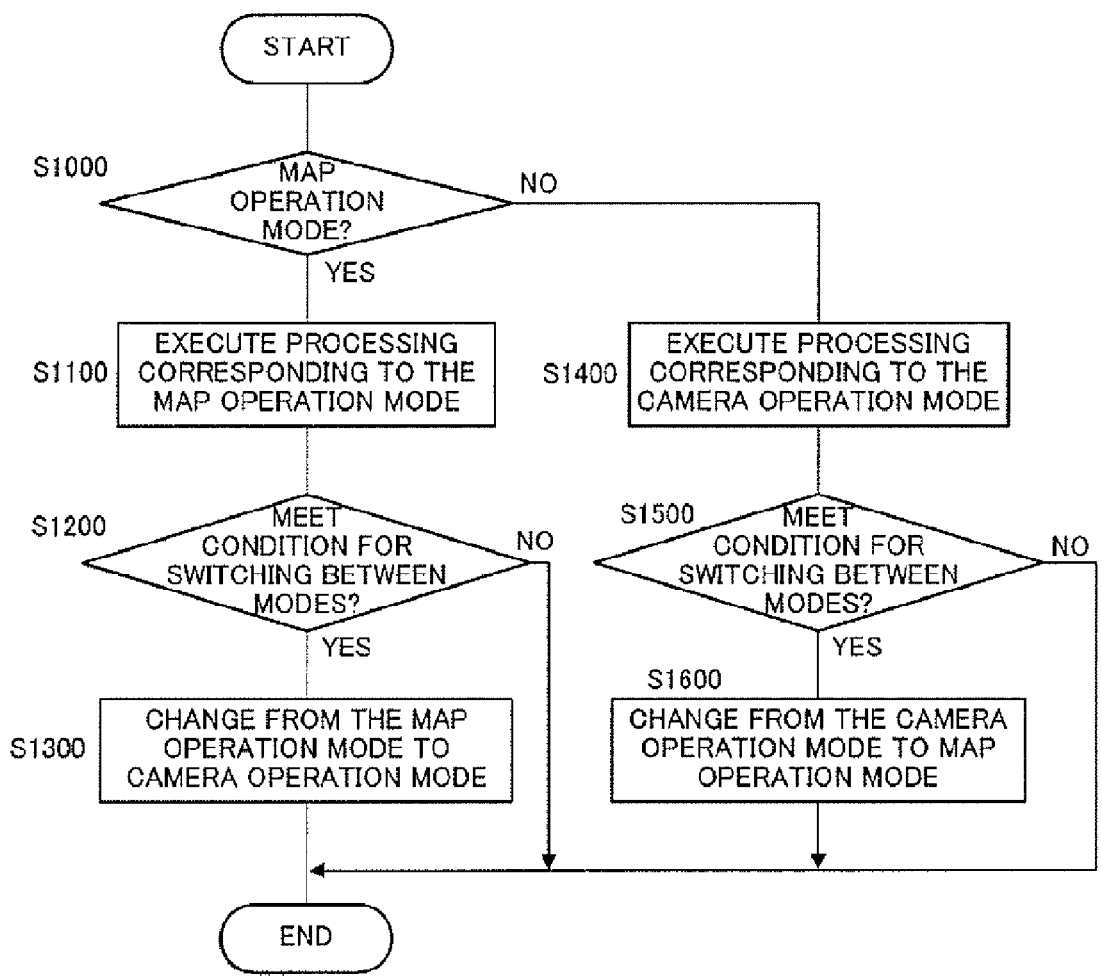
FIG. 5 is a flowchart illustrating operation of an operation management section.
FIG. 6 is a diagram showing an example of conditions to switch between a map operation mode and a camera operation mode.

Herein, FIG. 5 is a flowchart illustrating the operation of operation management section 140 when a user operates console 152 of FIG. 3. FIG. 6 is a diagram showing an example of conditions to switch between a map operation mode for selecting an operation target camera from camera icons displayed or the map and a camera operation mode for varying the shooting direction and shooting magnification of the operation target camera. FIG. 6 shows at the left side the condition for switching from the map operation mode to the camera operation mode, while showing at the right side the condition for switching from the camera operation mode to the map operation mode. Processing procedures as shown in FIG. 5 are started by the user operating console 152.

First, in step S1000, it is determined whether a current operation mode is the map operation mode or camera operation mode. As a result of the determination, the processing flow proceeds to step S1100 when the current mode is the map operation mode (S1000: YES) r while proceeding to step S1400 when the current mode is the camera operation mode (S1000: NO).

In step S1100, operation management section 140 executes the processing corresponding to the map operation mode.

For example, when the user moves operation lever 154 from side to side and/or up and down, operation management section 140 transmits a signal for moving the map from side to side and/or up and down corresponding to the movement amount and movement direction to map operation section 130.

Further, when the user pushes wide button 156, operation management section 140 transmits to map control section 130 a signal for increasing the denominator of a fraction indicating the scale of the map to scale the map down. This Embodiment deals the scale of the map in fraction form with the numerator of "1". Similarly, when the user pushes zoom button 158, operation management section 140 transmits to map control section 130 a signal for decreasing the denominator of a fraction indicating the scale of the map to scale the map up.

Further, operation management section 140 finds a camera icon nearest the center of map window 164, and transmits a signal for displaying image data shot by the camera represented by the camera icon in mage window 166 to camera control section 120.

Then, in step S1200, operation management section 140 determines whether the condition for switching from the map operation mode to camera operation mode is met or not. As a result of the determination, the processing flow proceeds to step S1300 when the mode switching condition is met (S1200: YES), while it is finished immediately when the mode switching condition is not met (S1200: NO).

Herein, the algorithm of the condition for switching from the map operation mode to camera operation mode is to switch from the map operation mode to camera operation mode when the map is scaled up from a state for showing the entire surveillance area and the effect is not obtained by scaling the map up to a certain level or more. For example, operation management section 140 refers to a value of the scale of the map stored therein, and determines whether or not the scale exceeds a threshold "A" (see the left portion of FIG. 6).

In step S1300, operation management section 140 performs the processing for switching from the map operation mode to camera operation mode. For example, operation management section 140 selects a camera represented by a camera icon nearest the center of map window 164 as an operation target camera. Next, operation management section 140 transmits a signal for setting the shooting magnification of the operation target camera at "1" to camera operation section 120.

Meanwhile, in step S1400, operation management section 140 executes the processing corresponding to the camera operation mode.

For example, when the user moves operation lever 154 from side to side and/or up and down, operation management section 140 transmits a signal for moving the shooting direction of the operation target camera map from side to side and/or up and down corresponding to the movement amount and movement direction to camera control section 120.

Further, when the user pushes wide button 156, operation management section 140 transmits a signal for decreasing the shooting magnification of the operation target camera to camera control section 120. Similarly, when the user pushes zoom button 158, operation management section 140 transmits a signal for increasing the shooting magnification of the operation target camera to camera control section 120.

Then, in step S1500, operation management section 140 determines whether the condition for switching from the camera operation mode to map operation mode is met or not. As a result of the determination, the processing flow proceeds to step S1600 when the mode switching condition is met (S1500: YES), while it is finished immediately when the mode switching condition is not met (S1500: NO).

Herein, the algorithm of the condition for switching from the camera operation mode to map operation mode is to switch from the camera operation mode to map operation mode when the shooting magnification is decreased from a zooming state with the high shooting magnification and the effect is not obtained by decreasing the shooting magnification to a certain level or less. For example, operation management section 140 refers to the shooting magnification of the operation target camera stored therein, and determines whether or not the magnification is less than threshold "1" (see the right portion of FIG. 6).

In step S1600, operation management section 140 performs the processing for switching from the camera operation mode to map operation mode. For example, operation management section 140 transmits a signal for controlling the map so that the camera icon representing the operation target camera is positioned in the center of map window 164.

Described next are procedures for selecting an operation target camera from on the man indicating installation positions of a plurality of cameras, and changing the shooting direction and shooting magnification, with reference to the operation method of console 152 and display screens of display device 160 using FIGS. 7 to 9.

Figure 7A:
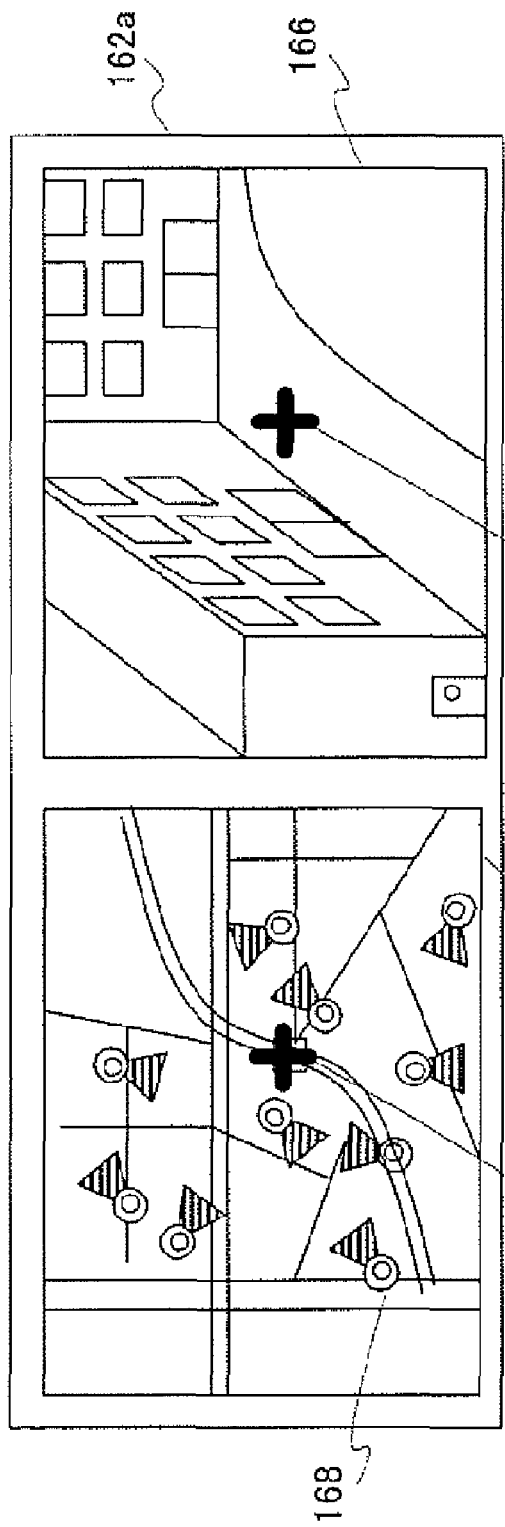
FIG. 7A is a diagram showing an example of a display screen in the map operation mode.
Figure 7B:
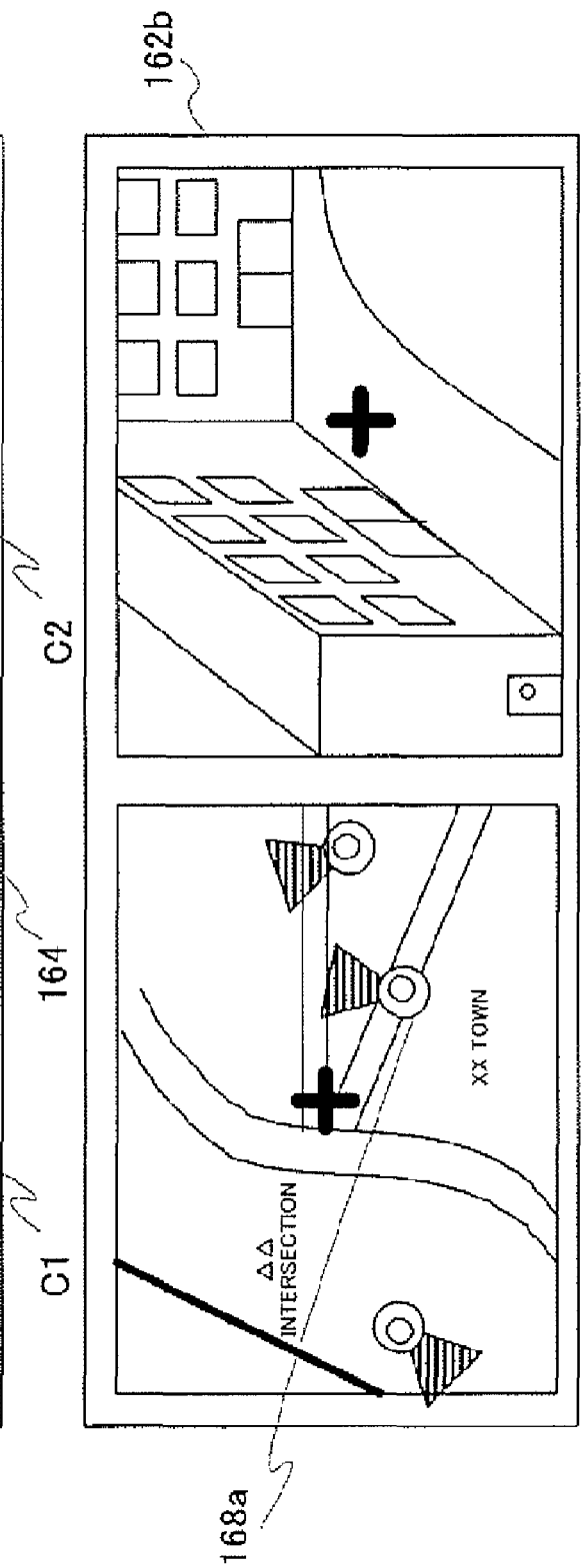
FIG. 7B is a diagram showing another example of the display screen in the map operation mode.

Herein, FIGS. 7A and 7B show display screens in the map operation mode. Particularly, FIG. 7A shows display screen 162a when the entire surveillance area is displayed, while FIG. 7B shows display screen 162b immediately before switching from the map operation mode to camera operation mode. In addition, in the figures, "164" denotes the map window, "C1" denotes the center of map window 164, "168" denotes a camera icon, "166" denotes the image window, and "C2" denotes the center of image window 166.

Figure 8A:
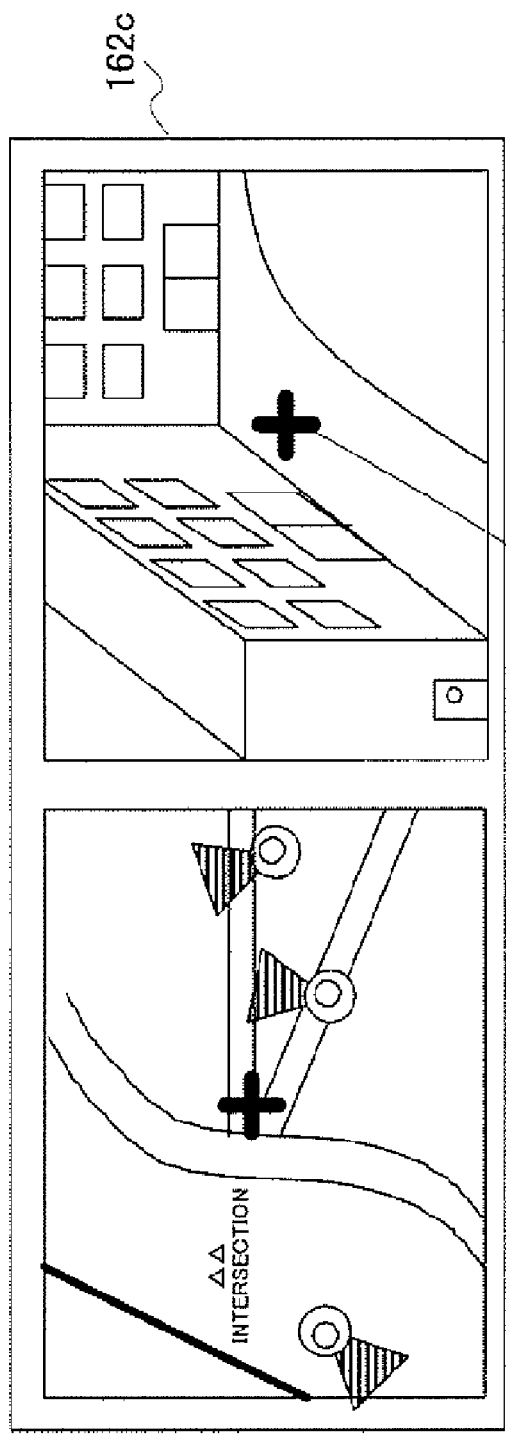
FIG. 8A is a diagram showing an example of a display screen in a camera operation mode.
Figure 8B:
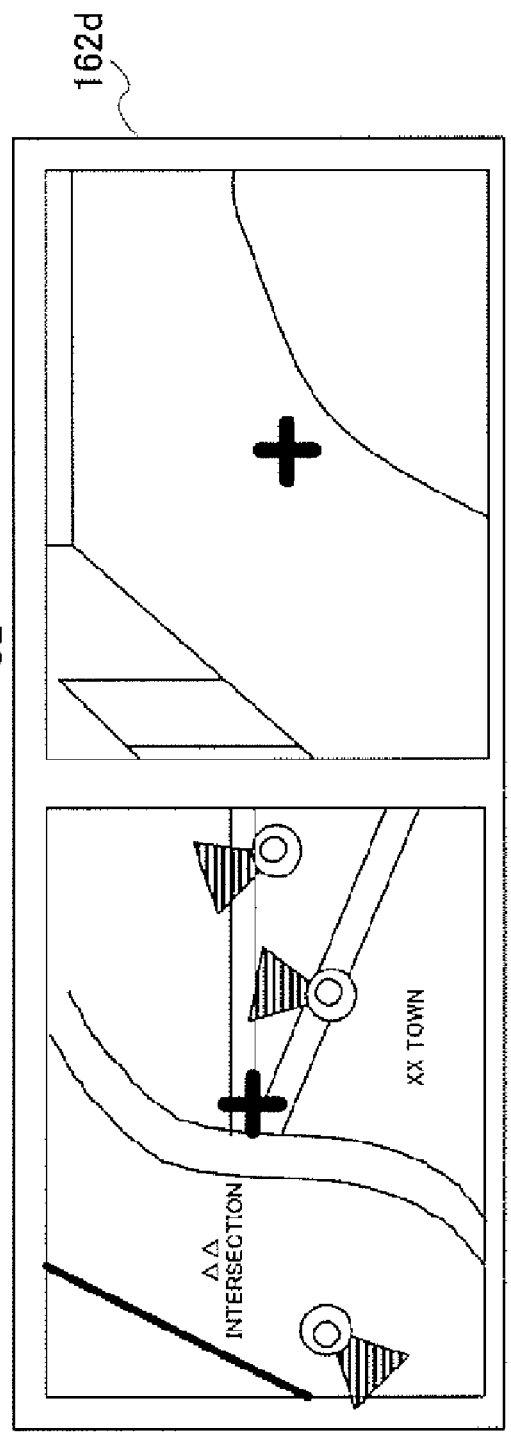
FIG. 8B is a diagram showing another example of the display screen in the camera operation mode.

FIGS. 8A and 8B show display screens in the camera operation mode. Particularly, FIG. 8A shows display screen 162c immediately after switching from the map operation mode to camera operation mode, while FIG. 8B shows display screen 162d with the highest shooting magnification of the operation target camera.

Figure 9A:
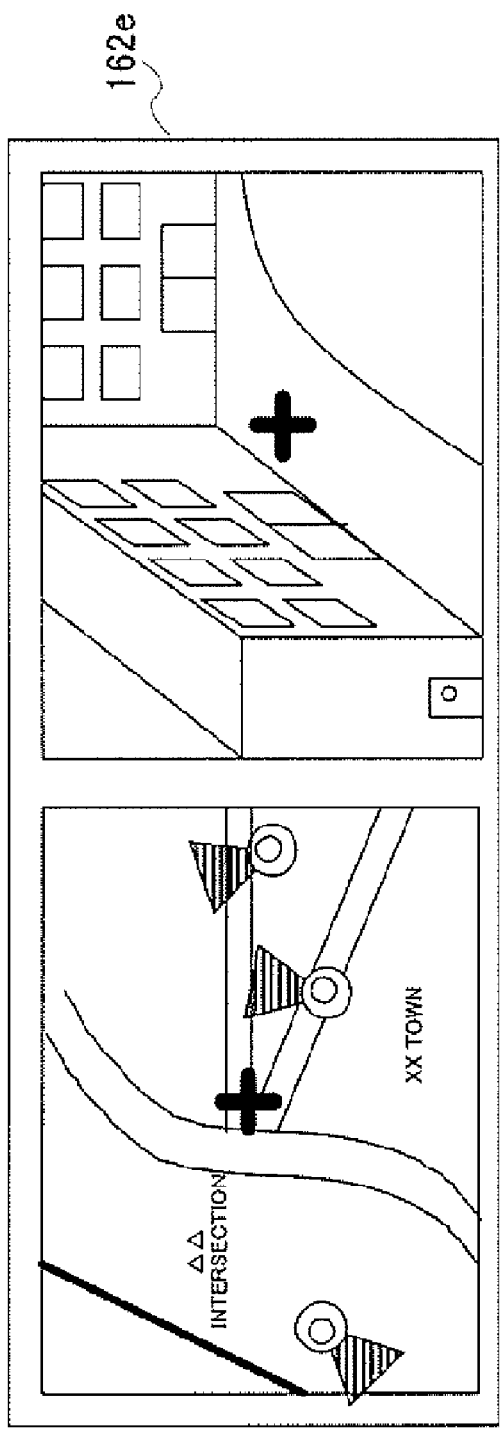
FIG. 9A is a diagram showing an example of a display screen before switching from the camera operation mode to the map operation mode.
Figure 9B:
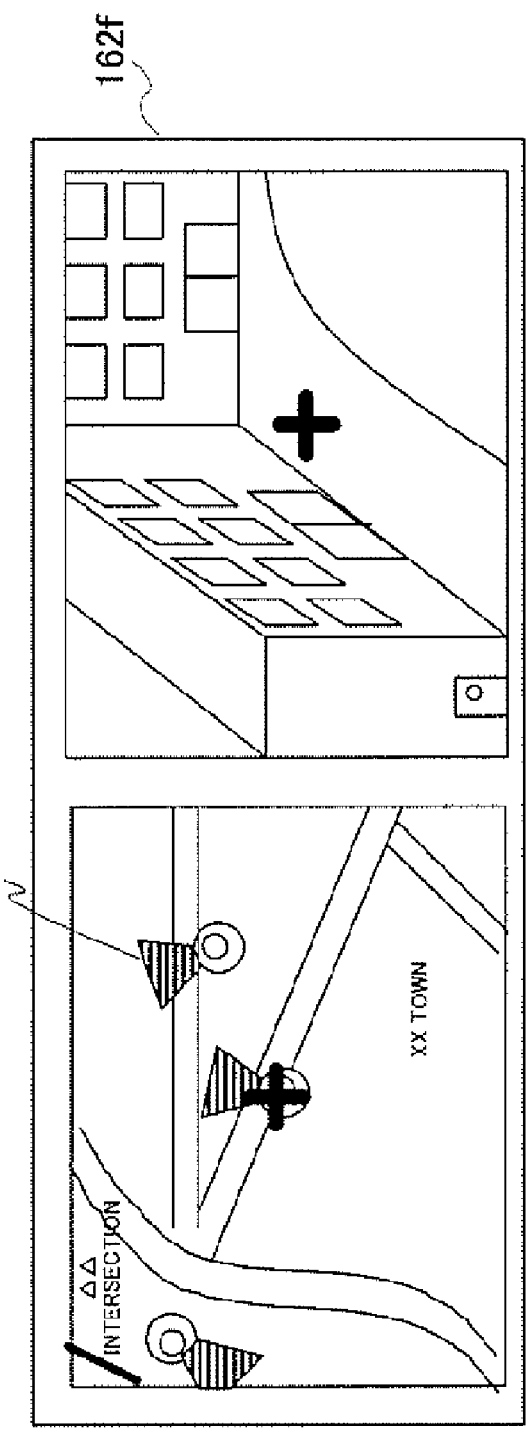
FIG. 9B is a diagram showing an example of a display screen after switching from the camera operation mode to the map operation mode.

FIGS. 9A and 9B show display screens before and after switching from the camera operation mode to map operation mode. Particularly, FIG. 9A shows display screen 162e immediately before switching from the camera operation mode to map operation mode, while FIG. 9B shows display screen 162f immediately after switching from the camera operation mode to map operation mode. In addition, in the Figure, "166b" denotes a camera icon representing the camera that is operated in the camera operation mode.

The procedures will be described below sequentially.

Display screen 162a in FIG. 7A is a display screen when surveillance device 100 is started, and displays the entire surveillance area on the map window 164. Image window 166 displays an image shot by a camera represented by a camera icon nearest center C1 of map window 164.

Herein, when the user moves operation Lever 154 from side to side and/or up and down, since the mode is the map operation mode, the map moves from side to side and/or up and down corresponding to the movement amount and movement direction of operation lever 154. Further, when the user pushes zoom button 158 continuously, the map is smoothly enlarged with center C1 of map window 164 being the center to display screen 162b that is displayed immediately before the map operation mode is switched to the camera operation mode. Similarly, when the user pushes wide button 156 continuously, the map is smoothly reduced with center C1 of map window 164 being the center to display screen 162a that displays the entire surveillance area.

Thus, the user is capable of operating the map through intuition using operation lever 154, wide button 156, and zoom button 158.

Meanwhile, in switching from the map operation mode to camera operation mode, the user is only required to further push zoom button 158 in the state of display screen 162b. At this point, a camera represented by camera icon 168a nearest center C1 of map window 164 is selected as an operation target camera, and the map operation mode is switched to the camera operation mode.

Thus, only by pushing zoom button 158 continuously, the user is capable of automatically selecting an operation target camera, and switching from the map operation mode to camera operation mode.

The camera operation mode will be described below.

Display screen 162c in FIG. 8A is a display screen immediately after the map operation mode is switched to the camera operation mode, and is such a state that the shooting magnification of the operation target camera is "1" and it can be shot in the widest angle.

Herein, when the user moves operation lever 154 from side to side and/or up and down, since the mode is the camera operation mode, the shooting direction of the operation target camera moves from side to side and/or up and down corresponding to the movement amount and movement direction of operation lever 154. Further, when the user pushes zoom button 158 continuously, the image is smoothly enlarged with center C2 of image window 166 being the center to display screen 162d that is displayed when the operation target camera zooms in the most. Similarly, when the user pushes wide button 156 continuously, the image is smoothly reduced with center C2 of image window 166 being the center to display screen 162c that is shot by the operation target camera at the widest angle.

Thus, the user is capable of operating the operation target camera through intuition using operation lever 154, wide button 156, and zoom button 158.

Meanwhile, in switching from the camera operation mode to map operation mode, the user is only required to further push wide button 156 in the state of display screen 162e in FIG. 9A. At this point, camera icon 168b representing the operation target camera operated in the camera operation mode is displayed in center C1 of map window 164, and the camera operation mode is switched to the map operation mode.

Thus, only by pushing zoom button 156 continuously, the user is capable of automatically switching from the camera operation mode to map operation mode.

As described, according to this Embodiment, since the map operation and camera operation is automatically switched corresponding to the scale of a map and shooting magnification of a camera, it is possible to perform the map operation to select an operation target camera from among a plurality of camera icons existing on the map, and the camera operation to change the shooting direction and shooting magnification using the same operation means (console 152). In other words, the map operation and camera operation is operable by the same operation means, and it is possible to operate the surveillance device provided with a plurality of cameras with ease.

In addition, in this Embodiment, the scale of the map is used as a criterion for switching from the map operation mode to camera operation mode, but the invention is not limited thereto. Switching is capable of being executed similarly using the number of camera icons 168 existing on map window 164. For example, in the case where only one camera icon 168 exists on map window 164, the camera icon may be regarded as being an operation target camera. In this case, by the user pushing zoom button 158, the map operation mode is switched to the camera operation mode.

Figure 10B:
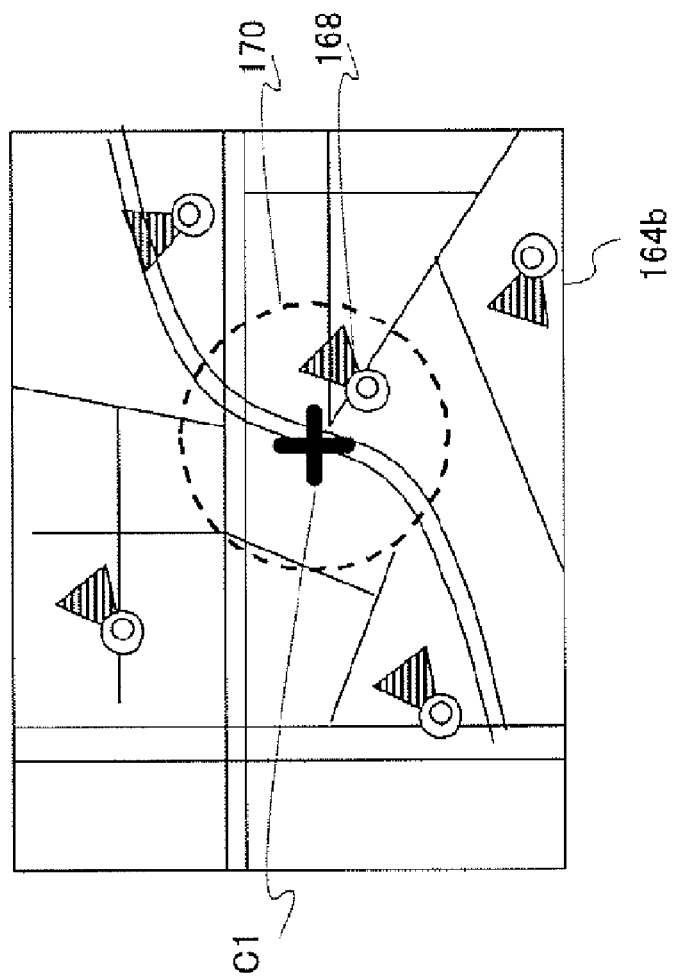
FIG. 10B is a diagram showing another example of the switching condition corresponding to the number of camera icons.
Figure 10A:
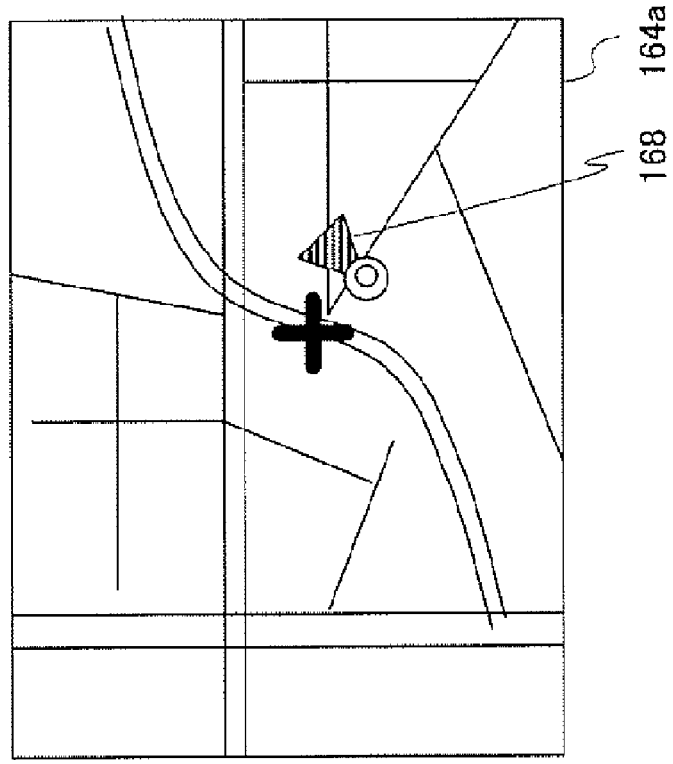
FIG. 10A is a diagram showing an example of a switching condition corresponding to the number of camera icons.

FIGS. 10A and 10B are diagrams showing an example of a condition for switching from the map operation mode to camera operation mode corresponding to the number of camera icons 168 existing on map window 164. In particular, map window 164a in FIG. 10A is of the case where a single camera icon 168 only exists on the map window, while map window 164b in FIG. 10B is of the case where a single camera icon 168 exists within a certain range 170 from center C1 of map window 164.

For example, the map operation mode is switched to the camera operation node when the user pushes zoom button 158 in the state of map window 164a in FIG. 10A, whereby it is possible to switch the map operation mode to camera operation mode easily without enlarging the map.

Similarly, the map operation mode may be switched to the camera operation mode when the user pushes zoom button 158 in the state of map window 164b (i.e. in the state where a target area is not the entire map window 164, but within a certain range from center C1 of map window 164) in FIG. 10B. While the switching condition is tightened when camera icons 168 densely, the map operation mode can be switched to the camera operation mode with ease when camera icons 168 do not exist densely.

Further, it is possible to switch from the map operation mode to camera operation mode corresponding to the scale of the map and the number of cameras. For example, as shown in FIG. 11, a threshold of the scale of the map is determined corresponding to the number of camera cons 168 existing on map window 164, whereby it is possible to finely set control for switching from the map operation mode to camera operation mode.

Furthermore, it is possible to switch from the map operation mode to camera operation mode corresponding to a position displayed by the map and the scale of the map. For example, different thresholds of the scale of the map that is a criterion for switching from the map operation mode to camera operation mode are determined between urban areas with dense cameras and river areas without dense cameras, whereby it is possible to perform optimum switching corresponding to the camera installation place.

It is also possible to store the Time the user performs the operation in each operation mode such as the map operation mode, camera operation mode and the like, and switch between operation modes corresponding to the operation time. For example, when the user performs some operation in the map operation mode and the time of non-operation state exceeds a predetermined value, the camera control device may predict that the user is looking at the image screen, and switch from the map operation mode to camera operation mode. In this way, it is possible to perform switching that reflects the user's intention.

Further, it is possible to beforehand store the operation content in each operation mode, and switch between operation modes when a predetermined pattern of the operation content is performed. For example, in the map operation mode, when the user pushes zoom button 158 three times in a row without operating operation lever 154, camera control device may predict that the user wants to operate the camera near center C1 of map window 164, and switch from the map operation mode to camera operation mode, and is capable of performing switching that reflects the user's intention.

Embodiment 2

This Embodiment describes a method of automatically switching the display screen corresponding to each of the map operation and camera operation, and operating using the same operation means. In addition, as in Embodiment 1, this Embodiment describes about application to a surveillance device as an example of a camera control device.

Figure 12:
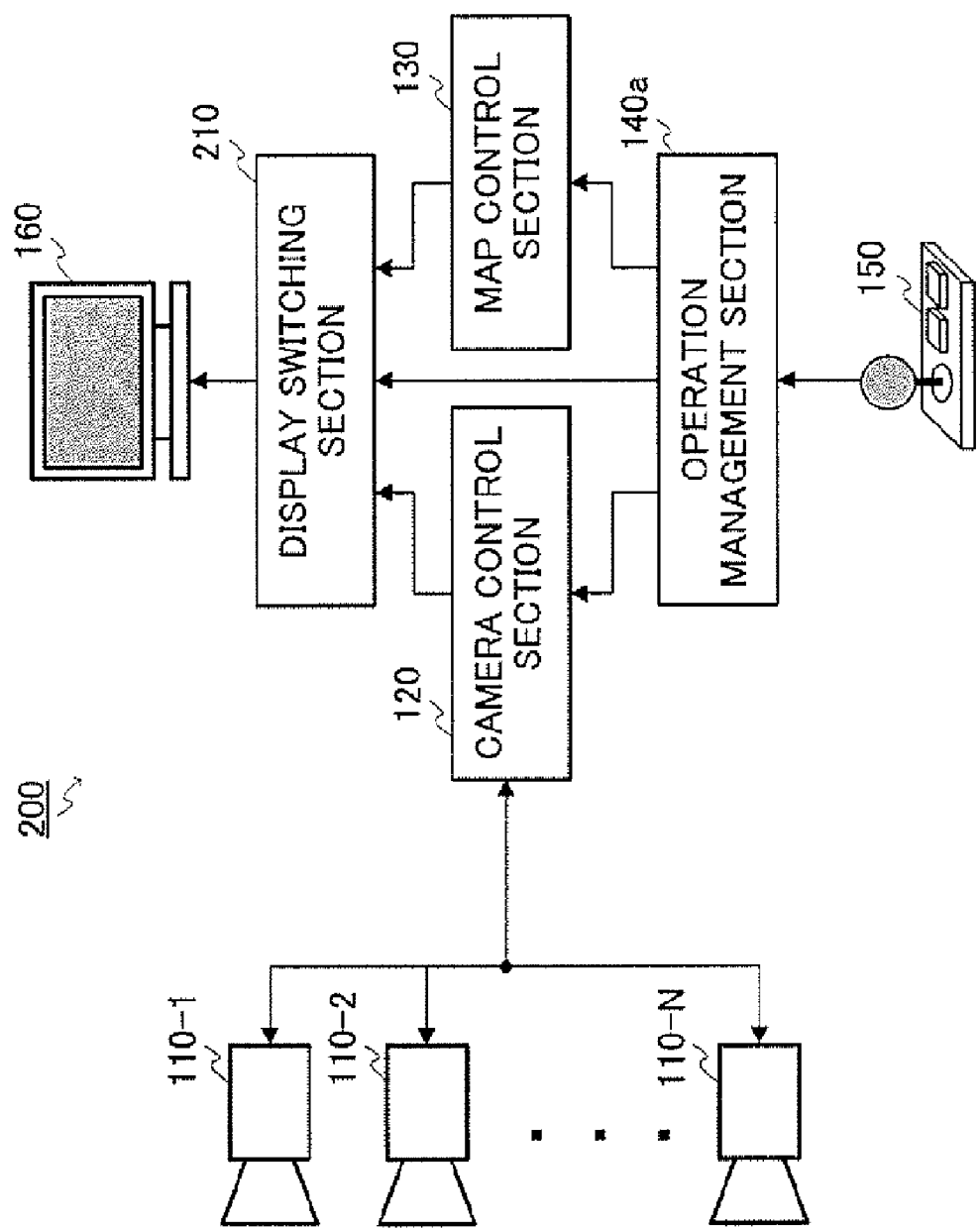
FIG. 12 is a diagram illustrating a configuration of a camera control device according to Embodiment 2 of the invention.

FIG. 12 is a diagram illustrating a configuration of a camera control device (surveillance device) according to Embodiment 2 of the invention. In addition, surveillance device 200 as shown in FIG. 12 has the same basic configuration as that of surveillance device 100 as shown in FIG. 2, and the same structural components are assigned the same reference numerals to omit descriptions thereof.

In this Embodiment, surveillance device 200 has a plurality of (for example, N) cameras 110-1 to 110-N, camera control section 120, map control section 130, operation management section 140a, common operation section 150, display device 160, and further, display switching section 210 that switches between the map data and image data.

Operation management section 140a has the same functions as those of operation management section 140 in FIG. 2, and further has a function of transmitting an operation mode signal for distinguishing between the map operation mode and camera operation mode to display switching section 210.

According to the operation mode signal from operation management section 140a, display switching section 210 switches between data to transmit to display device 160. For example, display switching section 210 transmits image data sent from camera operation section 120 to display device 160 in the camera operation mode, while transmitting map data sent from map control section 130 to display device 160 in the map operation mode.

By this means, while nap window 164 and image window 166 are aligned and displayed on display screen 162 in display device 160 (see FIG. 4) in Embodiment 1, in Embodiment 2, the map window and image window are automatically switched corresponding to the operation mode, and it is thereby possible to obtain the same effects as in Embodiment 1 even in a display device with a low-resolution display screen.

Figure 13A:
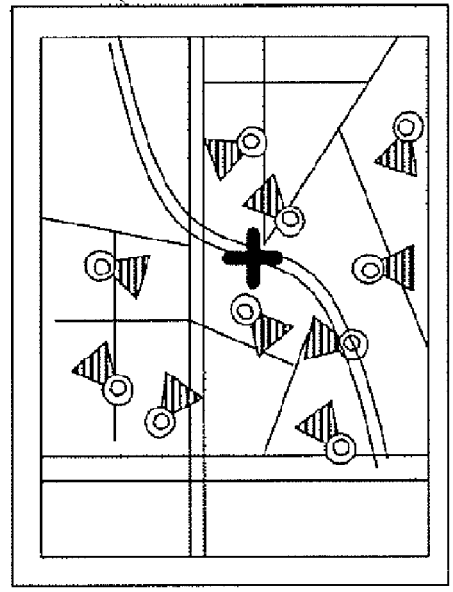
FIG. 13A is a diagram showing an example of a display screen.
Figure 13B:
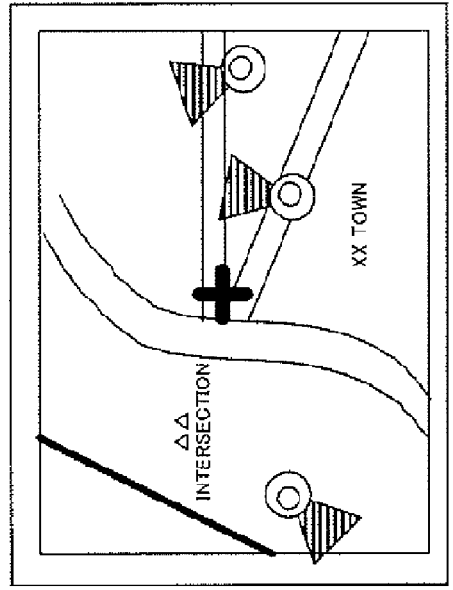
FIG. 13B is a diagram showing another example of the display screen.
Figure 13C:
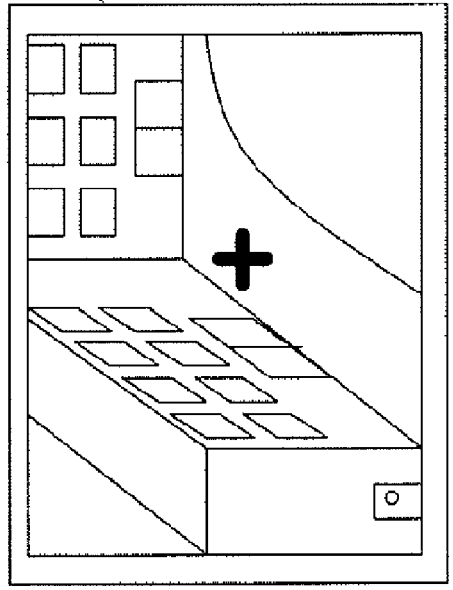
FIG. 13C is a diagram showing still another example of the display screen.
Figure 13D:
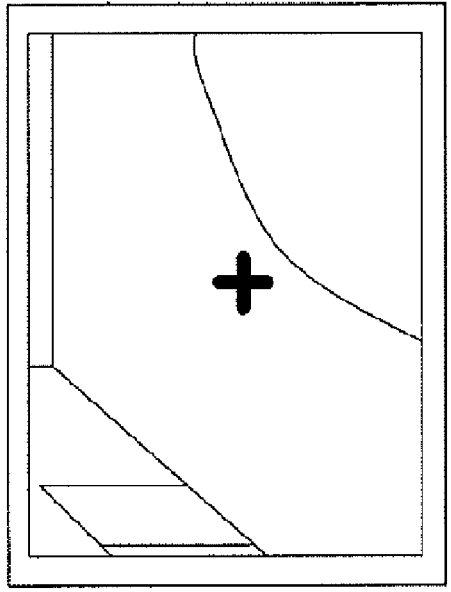
FIG. 13D is a diagram showing a further example of the display screen.

FIGS. 13A to 13D show examples of display screens of display device 160 corresponding to this Embodiment. Particularly, FIG. 13A shows display screen 220a that displays the entire surveillance area, FIG. 13B shows display screen 220b immediately before the map operation mode is switched to the camera operation mode, FIG. 13C shows display screen 220c immediately after the map operation mode is switched to the camera operation mode, and FIG. 13D shows display screen 220d with the highest shooting magnification of the operation target camera.

For example, when surveillance device 200 is started, first, the display screen becomes display screen 220a in FIG. 13A in the map operation mode. When the user pushes wide button 156 continuously in this state, the map is enlarged and the display screen becomes display screen 220b in FIG. 13B. When the user further pushes wide button 156 continuously, the map operation mode is switched to the camera operation mode, and the display screen becomes display screen 220c in FIG. 13C. Then, when the user furthermore pushes wide button 156 continuously, the image is enlarged up to the state of display screen 220d in FIG. 13D.

Thus, according to this Embodiment, the map window and image window are automatically switched in accordance with switching between the map operation and camera operation, and it is thereby possible to operate the surveillance device easily even using a display device with a low-resolution display screen.

Embodiment 3

This Embodiment describes a method of implementing a camera control device using a portable terminal such as a cellular telephone, Personal Digital Assistant (PDA) and the like having a low-resolution display screen and being limited in operation means. In addition, as in Embodiments 1 and 2, this Embodiment describes about application to a surveillance device as an example of a camera control device.

Figure 14:
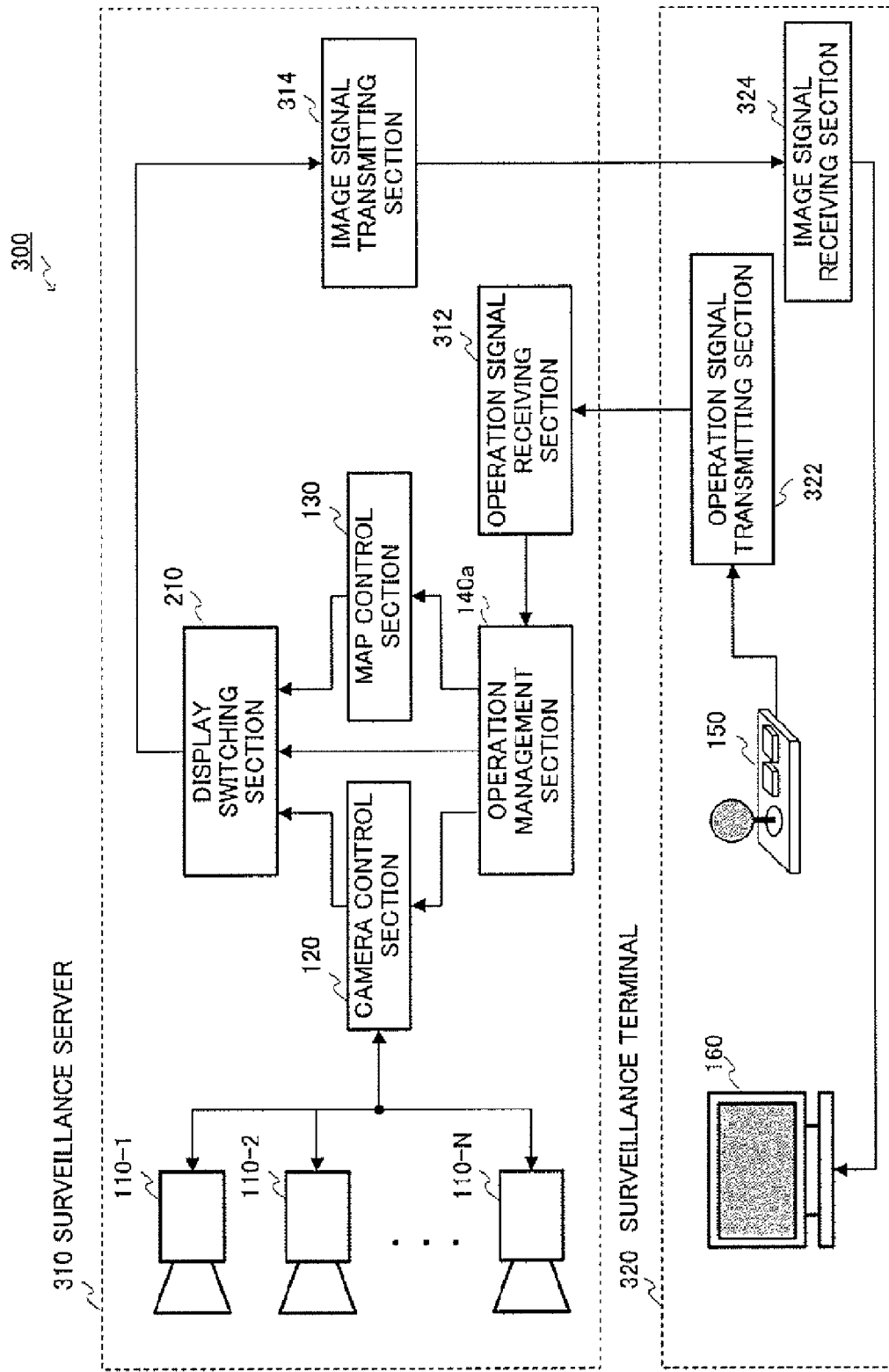
FIG. 14 is a diagram illustrating a configuration of a camera control device according to Embodiment 3 of the invention.

FIG. 14 is a diagram illustrating a configuration of a camera control device (surveillance device) according to Embodiment 3 of the invention. In addition, surveillance device 300 as shown in FIG. 14 has the same basic configuration as that of surveillance device 200 as shown in FIG. 12, and the same structural components are assigned the same reference numerals to omit descriptions thereof.

In this Embodiment, surveillance device 300 is broadly comprised of surveillance server 310 and surveillance terminal 320.

Surveillance server 31D has a plurality of (for example, N) cameras 110-1 to 110-N, camera control section 120, map control section 130, operation management section 140a, display switching section 210, and further, operation signal receiving section 312 and image signal transmitting section 314.

Surveillance terminal 320 has display device 160, common operation section 150, and further, operation signal transmitting section 322 and image signal receiving section 324.

Operation signal receiving section 312 receives an operation signal transmitted from operation signal transmitting section 322 of surveillance terminal 320 to output to operation management section 140a.

Operation signal transmitting section 322 transmits the operation signal sent from common operation section 150 to operation signal receiving section 312 of surveillance server 310.

Image signal transmitting section 314 transmits an image signal (image data) sent from display switching section 210 to image signal receiving section 324 of surveillance terminal 320.

Image signal receiving section 324 receives the image signal transmitted from image signal transmitting section 314 of surveillance server 310 to output to display device 160.

Figure 15:
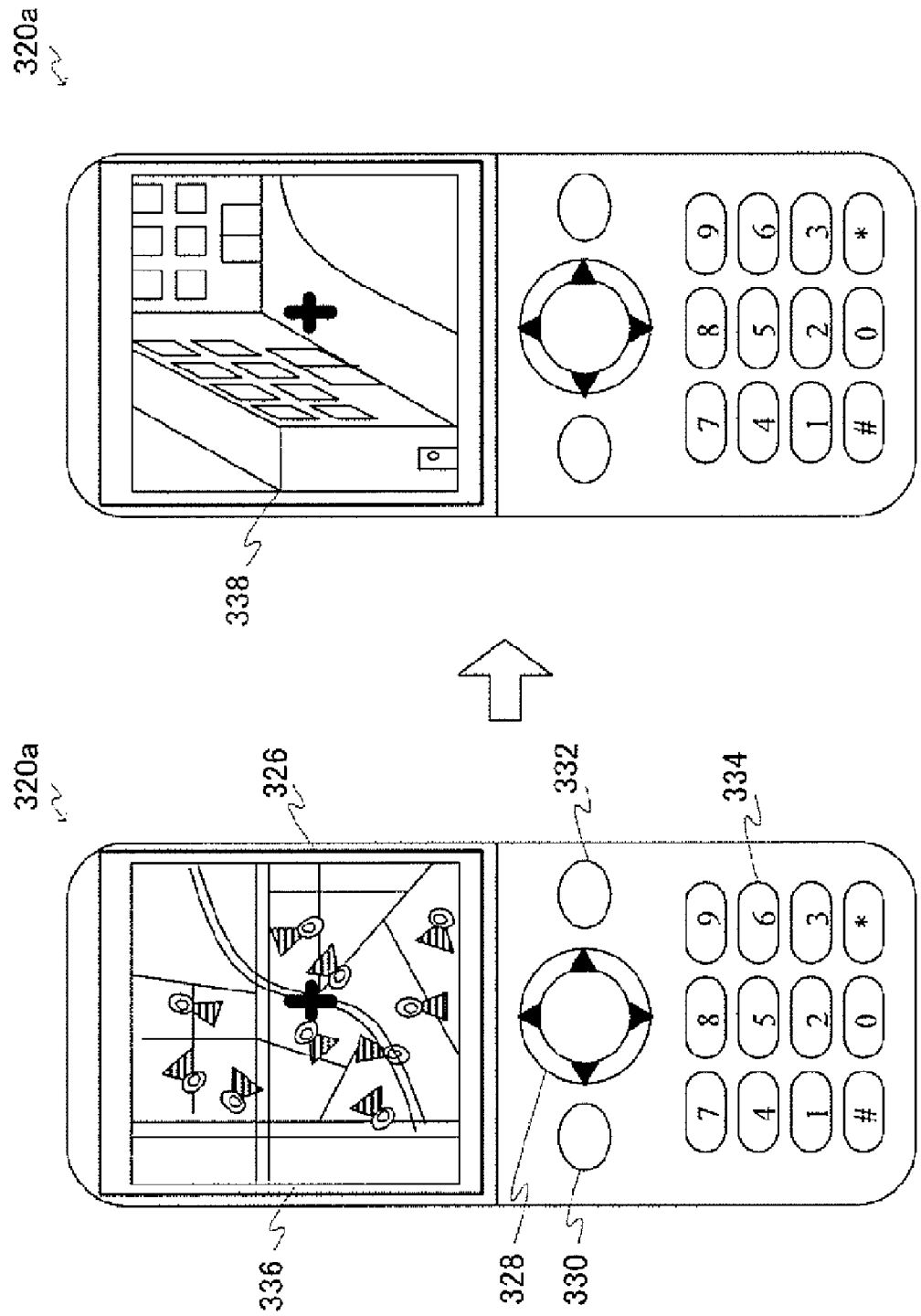
FIG. 15A is a diagram showing a configuration example of a surveillance terminal (in the map operation mode)
FIG. 15B is a diagram showing a configuration example of the surveillance terminal (in the camera operation mode)

FIGS. 15A and 15B are diagrams showing a configuration example of surveillance terminal 320 corresponding to this Embodiment. Herein, FIG. 15A shows a case in the map operation mode, while FIG. 15B shows a case in the camera operation mode.

Surveillance terminal 320a as shown in FIGS. 15A and 15B has display screen 326, direction button 328 for designating the up, down, right or left direction to select a menu of the cellular telephone and the like, and various buttons 330, 332 and 334 to open the menu of the cellular telephone. For example, button 330 is assigned to the wide button, while button 332 is assigned to the zoom button. In addition, buttons 334 are numeric buttons.

For example, after invoking a program to implement functions of surveillance terminal 320a comprised of Java (Trademark) or the like, the mode is the map operation mode, map window 336 is displayed on display screen 328 (see FIG. 15A), the map is moved from side to side and/or up and down using direction button 328, and the scale of the map is varied with button 330 assigned to the wide button and button 332 assigned to the zoom button.

Similarly, after zoom button 332 is pushed and the map operation mode is automatically switched to the camera operation mode, image window 338 is displayed on display screen 326 (see FIG. 15B), the shooting direction of the operation target camera is varied using direction button 328, and the shooting magnification is varied using buttons 330 and/or 332.

Further, when various patterns are assigned to the buttons, it is possible to assign a predetermined function to an arbitrary button. For example, it is possible to assign in numeric buttons 334 "8" to up, "2" to down, "4" to right, "6" to left, "#" to the wide button, and "*" to the zoom button. By making such assignments, the user is capable of operating the surveillance device with one hand.

Thus, according to this Embodiment, only by pushing the wide button and zoom button, the camera operation and map operation is automatically switched, the display screen is also automatically switched, and therefore, even in a portable terminal such as a cellular telephone, FDA and the like having a low-resolution display screen and being limited in operation means, it is possible to operate the surveillance device with one hand.

Embodiment 4

This Embodiment describes a method of superimposing reduced image data on the map window to display, and operating using the same operation means. In addition, as in Embodiments 1 to 3, this Embodiment describes about application to a surveillance device as an example of a camera control device.

Figure 16:
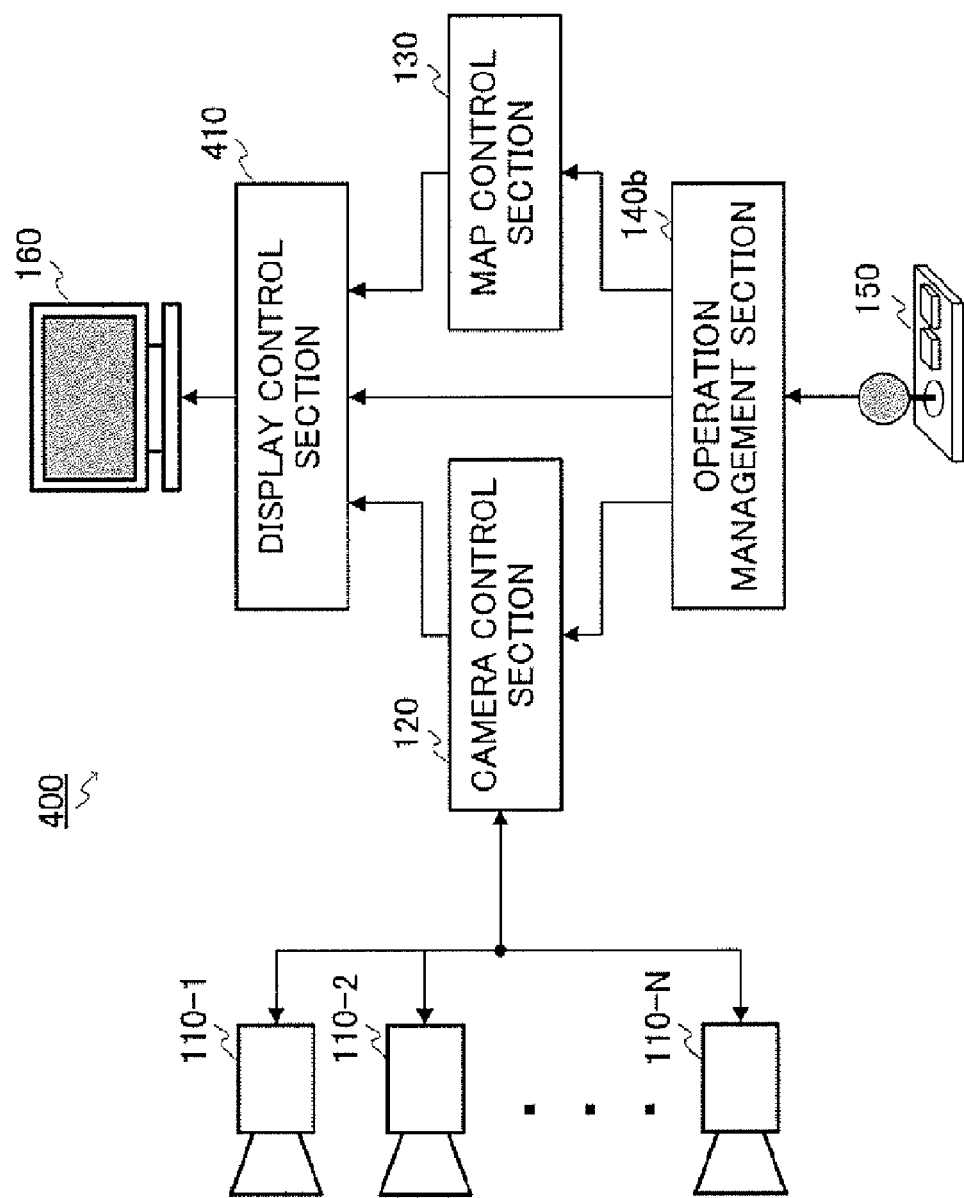
FIG. 16 is a diagram illustrating a configuration of a camera control device according to Embodiment 4 of the invention.

FIG. 16 is a diagram illustrating a configuration of a camera control device (surveillance device) according to Embodiment 4 of the invention. In addition, surveillance device 400 as shown in FIG. 16 has the same basic configuration as that of surveillance device 200 as shown in FIG. 12, and the same structural components are assigned the same reference numerals to omit descriptions thereof.

In this Embodiment, surveillance device 400 has a plurality of (for example, N) cameras 110-1 to 110-N, camera control section 120, map control section 13C, operation management section 140b, common operation section 150, display device 160, and further, display control section 410 that controls the map data and image data.

Operation management section 140b has the same functions as those of operation management section 140a in FIG. 12, and further has a function of generating in the map operation mode a signal for reducing the image data corresponding to the scale of the map and/or the number of camera icons existing within the map window to superimpose and display on the map window, and transmitting the signal to display control section 410.

Display control section 410 has the same functions as those of display switching section 210 in FIG. 12, and further has a function of reducing in the map operation mode the image data from camera control section 120 according to the signal sent from operation management section 140b, and superimposing the image data on the map data from map control section 130 to transmit to display device 160.

Figure 17B:
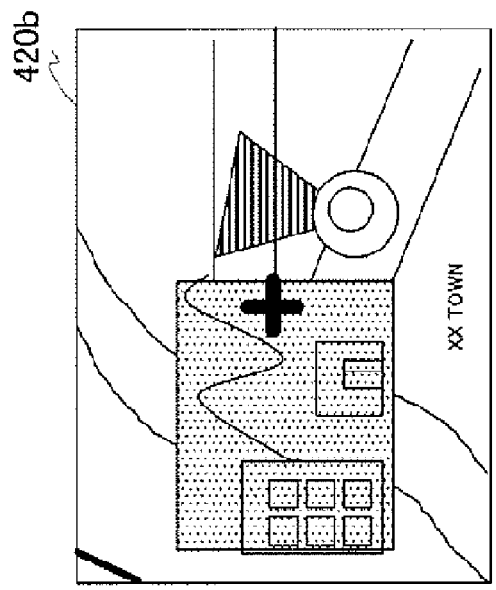
FIG. 17B is a diagram showing another example of the display screen that superimposes the image screen on the map window to display.
Figure 17A:
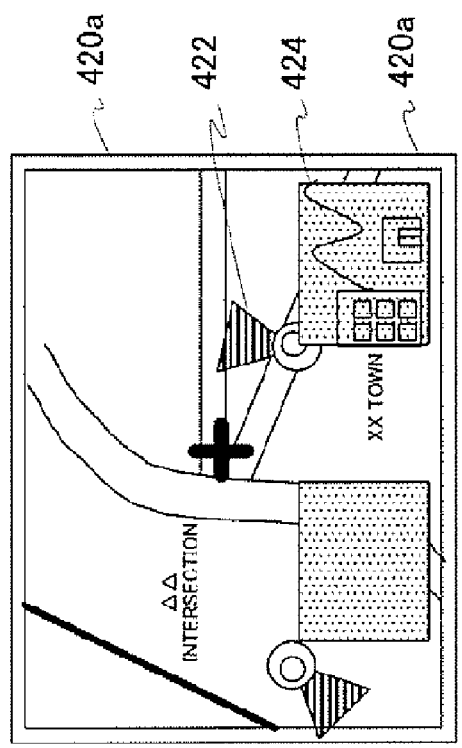
FIG. 17A is a diagram showing an example of a display screen that superimposes an image screen on a map window to display.
Figure 17C:
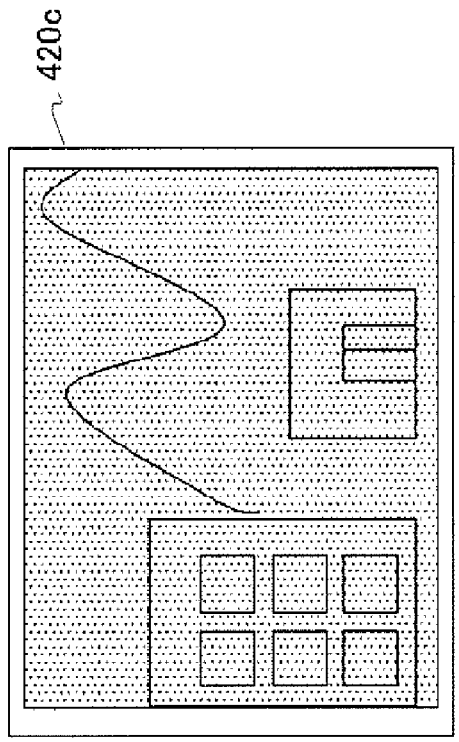
FIG. 17C is a diagram showing still another example of the display screen that superimposes the image screen on the map window to display.

FIGS. 17A to 17C show an example of superimposing an image screen on the map window to display in the map operation mode. Particularly, FIG. 17A shows display screen 420a in the map operation mode, FIG. 17b shows display screen 420b when the map is enlarged from the state as shown in FIG. 17A, and FIG. 17C shows display screen 420c immediately after the map is enlarged from the state as shown in FIG. 17B and the mode is switched to the camera operation mode. In addition, in the figure, "422" denotes a camera icon, while "424" denotes an image screen of a camera represented by camera icon 422.

For example, in display screen 420a in FIG. 17A, image screen 424 is reduced, and superimposed on near camera icon 422. When the user pushes the zoom button in this state, the map and image screen are smoothly enlarged to display screen 420b in FIG. 17B. Then, when the user further pushes the zoom button, the map operation mode is switched to the camera operation mode, and the display screen becomes display screen 420c in FIG. 17C that displays the image data on the entire screen.

Thus, when the user pushes the zoom button continuously, the image screen displayed on the map is smoothly enlarged, and displayed on the entire display screen after the map operation mode is switched to the camera operation mode. It is thereby possible to check the image of the camera even in the map operation mode, and the effect is obtained that the user is capable of recognizing easier switching from the map operation mode to camera operation mode.

Embodiment 5

This Embodiment describes a camera control device for automatically switching between the map operation and camera operation corresponding to an alarm signal from a fire sensor. In addition, as in Embodiments 1 to 4, this Embodiment describes about application to a surveillance device as an example of a camera control device.

Figure 18:
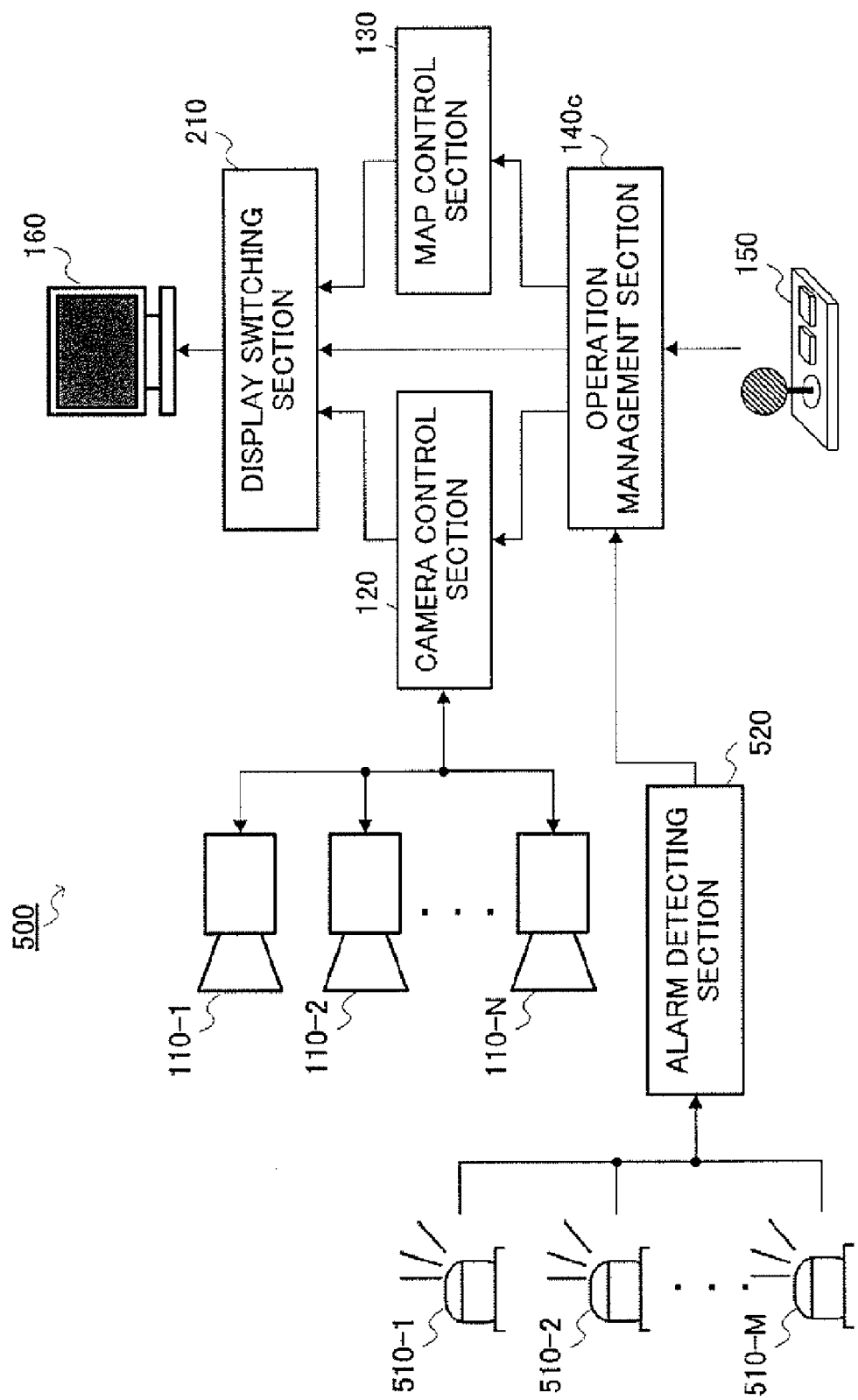
FIG. 18 is a diagram illustrating a configuration of a camera control device according to Embodiment 5 of the invention.

FIG. 18 is a diagram illustrating a configuration of a camera control device (surveillance device) according to Embodiment 5 of the invention. In addition, surveillance device 500 as shown in FIG. 18 has the same basic configuration as that of surveillance device 200 as shown in FIG. 12, and the same structural components are assigned the same reference numerals to omit descriptions thereof.

In this Embodiment, surveillance device 500 is comprised of a plurality of (for example, N) cameras 110-1 to 110-N, camera control section 120, map control section 130, operation management section 140c, common operation section 150, display device 160, display switching section 210, and further, a plurality of (M) fire sensors 510-1 to 510-M, and alarm detecting section 520 that detects an alarm signal from each of fire sensors 510-1 to 510-M.

Alarm detecting section 520 puts together alarm signals transmitted respectively from fire sensors 510-1 to 510-M, and reads alarm information such as a fire breaking location and the like contained in each alarm signal to transmit to operation management section 140c.

Operation management section 140c has the same functions as those of operation management section 140a in FIG. 12, and further has a function of automatically switching between the map operation and camera operation according to the alarm information sent from alarm detecting section 520.

Figure 19:
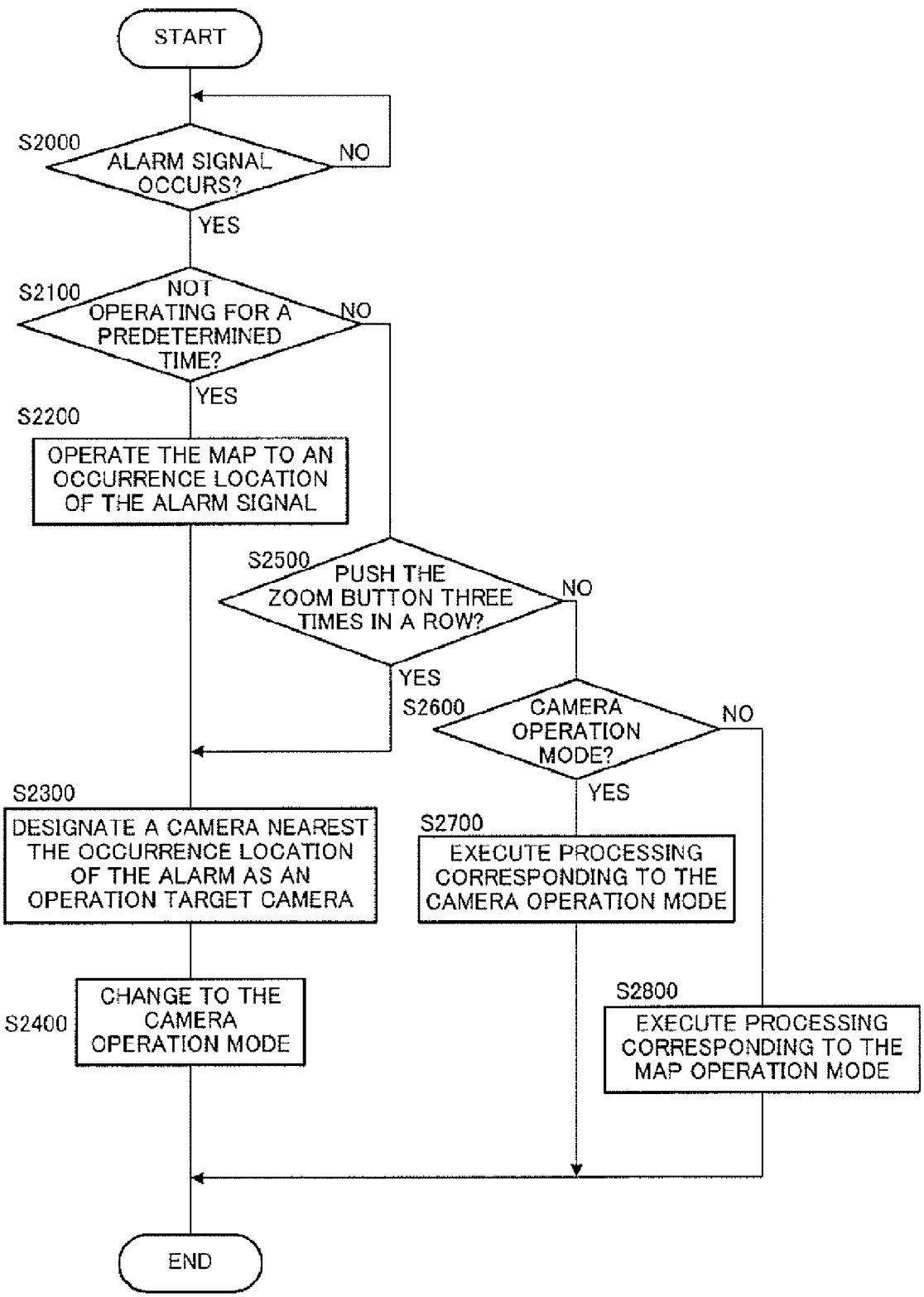
FIG. 19 is a flowchart illustrating the operation of the operation management section.

FIG. 19 is a flowchart illustrating an example of the operation of operation management section 140c.

First, in step S2000, operation management section 140c determines whether or not a fire is detected and an alarm signal is generated. As a result of the determination, operation management section 140c proceeds to step S2100 when the alarm signal is generated (S2000: YES), while waiting when the alarm signal is not generated (S2000: NO).

In step S2100, operation management section 140c determines whether or not an operation signal is transmitted from common operation section 150 within a predetermined time. As a result of the determination, operation management section 140c proceeds to step S2200 when the operation signal is not transmitted within a predetermined time (S2100: YES), while proceeding to step S2500 when the operation signal is transmitted within a predetermined time (S2100: NO).

In step S2200, to automatically provide the place of the fire breaking location and the image of the location to the user, operation management section 140c transmits a signal for displaying an occurrence location of the alarm signal in the center of the screen of display device 160 to map control section 130. By this means, the occurrence location of the alarm signal is displayed in the center of the screen of display device 160.

Then, in step S2300, operation management section 10c transmits a signal for designating a camera existing nearest the occurrence location of the alarm signal as an operation target camera to camera control section 120.

Then, in step S2400, after changing the operation mode to the camera operation mode, operation management section 140c displays the image shot by the operation target camera on the screen of display device 160.

Meanwhile, in step S2500, when the operation signal is transmitted from common operation section 150 within a predetermined time, the camera control device determines that the user desires to check the image near the alarm occurrence location immediately. For example, it is determined whether or not zoom button 158 is pushed three times in a row. As a result of the determination, operation management section 140c immediately proceeds to step S2300 when zoom button 158 is pushed three times in a row (S2500: YES), while proceeding to step S2600 to reflect the content of the operation signal when zoom button 158 is not pushed three times in a row (S2500: NO).

In step S2600, operation management section 140c determines whether or not the current operation mode is the camera operation mode. As a result of the determination, operation management section 140c proceeds to step S2700 when the current operation mode is the camera operation mode (S2600: YES), while proceeding to step S2800 when the current operation mode is not the camera operation mode i.e. is the map operation mode (S2600: NO).

In step S2700, operation management section 140c executes the processing corresponding to the camera operation mode (see step S1400 in FIG. 5).

Meanwhile, in step S2800, operation management section 140c executes the processing corresponding to the map operation mode (see step S1100 in FIG. 5).

Thus, according to this Embodiment, when an alarm signal arises, the camera control device reads the alarm information such as a disaster occurring location contained in the alarm signal, automatically switches between the camera operation and map operation, and is thereby capable of controlling a camera installed near the disaster promptly without making a selection of the operation target camera.

In addition, a fire sensor is used as one of various sensors in this Embodiment, but the invention is not limited thereto. For example, when a human-sensing sensor is used, it is possible to automatically display an intrusion point when a suspicious stranger enters in surveillance of a building at nighttime, and further, to control a camera near the intrusion point without designating an operation target camera.

Moreover, the camera control device may switch between the map operation and camera operation corresponding to the information of the alarm signal transmitted from the sensor. For example, when the temperature information transmitted from a fire alarm is more than or equal to a threshold, the camera control device may determine that the fire is large in scale and urgent, and immediately display the image near the occurrence location of the alarm signal.

Embodiment 6

This Embodiment describes an application example in fields of car navigation and the like as an example of a camera control device. Described particularly is a camera control device that implements state management of products appearing in a range shot by the camera, in addition to the map operation and camera operation, using the same operation means.

Figure 20:
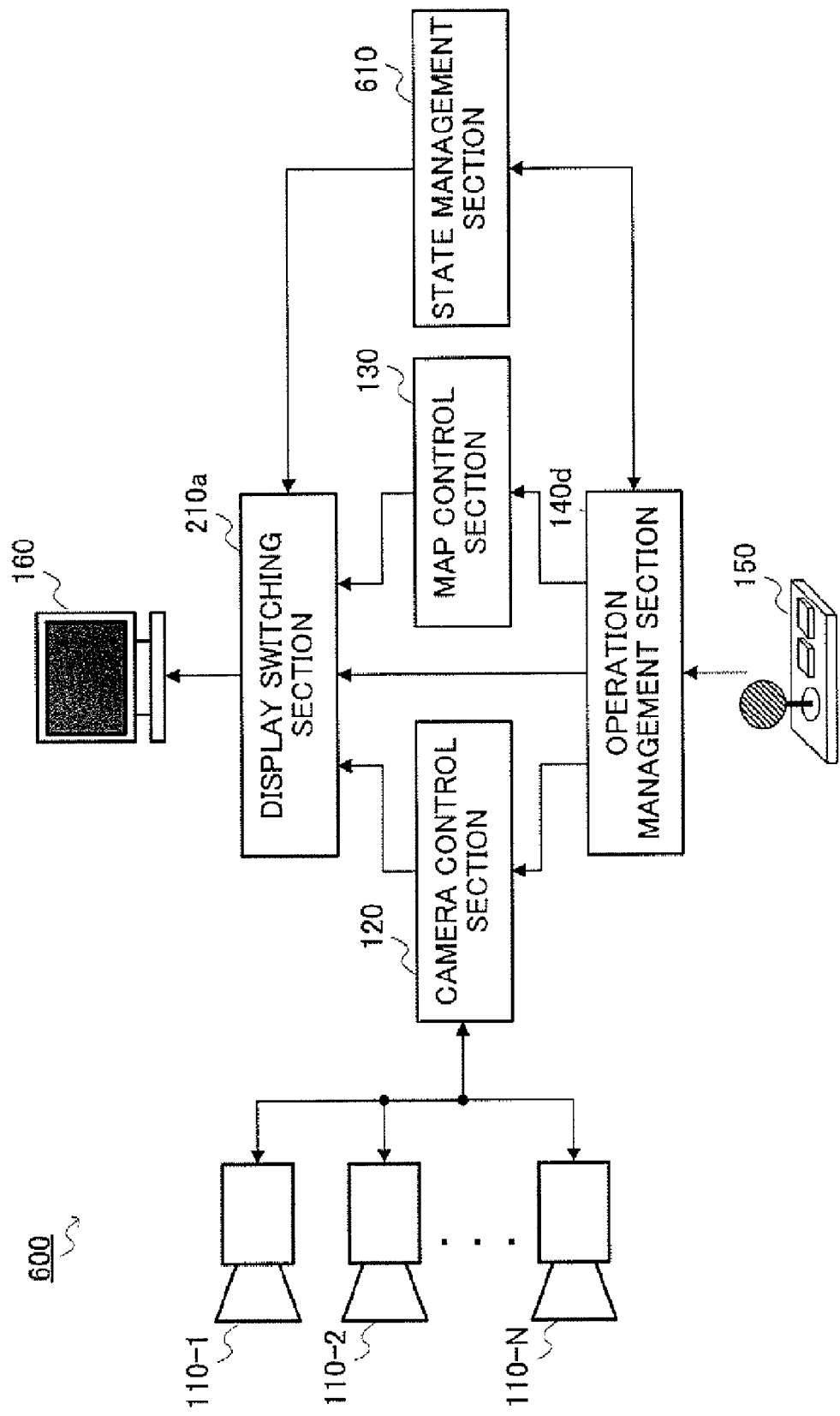
FIG. 20 is a diagram illustrating a configuration of a camera control device according to Embodiment 6 of the invention.

FIG. 20 is a diagram illustrating a configuration of a camera control device according to Embodiment 6 of the invention. In addition, surveillance device 600 as shown in FIG. 20 has the same basic configuration as that of camera control device (surveillance device) 200 as shown in FIG. 12, and the same structural components are assigned the same reference numerals to omit descriptions thereof.

In this Embodiment, camera control device 600 has a plurality of (for example, N) cameras 110-1 to 110-N, camera control section 12C, map control section 130, operation management section 140d, common operation section 150, display device 160, display switching section 210a that switches between the map data and image data, and further, state management section 610 that manages a state inside an area shot by the camera.

State management section 610 has a function of managing the state of an area shot by the camera. More specifically, for example, in this Embodiment, state management section 610 manages a purchase state including a product code, purchase amount, the number of purchased products and the like of a product shot by the operation target camera, while transmitting the purchase state to display switching section 210a and operation management section 140d.

Display switching section 210a has the same functions as those of display switching section 210 in FIG. 12, and further, has a function of transmitting the purchase state transmitted from state management section 610 to display device 160 when an operation mode signal transmitted from operation management section 140*d* is of state management mode.

Operation management section 140*d* has the same functions as those of operation management section 140*a* in FIG. 12, and further, has a function of automatically switching between the map operation and camera operation according to a predetermined condition, for example, shooting direction and/or shooting magnification of the camera, or a value of purchase amount included in the purchase state.

The operation of operation management section 140*d* will be described below with reference to FIG. 21.

Figure 21A:
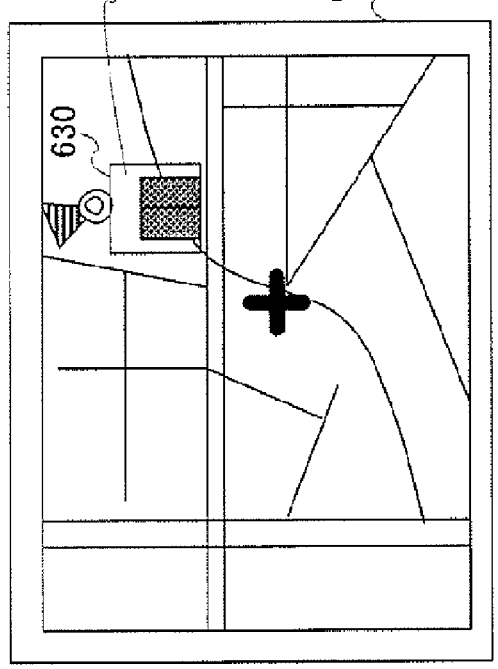
FIG. 21A is a diagram showing an example of a display screen in the map operation mode.
Figure 21B:
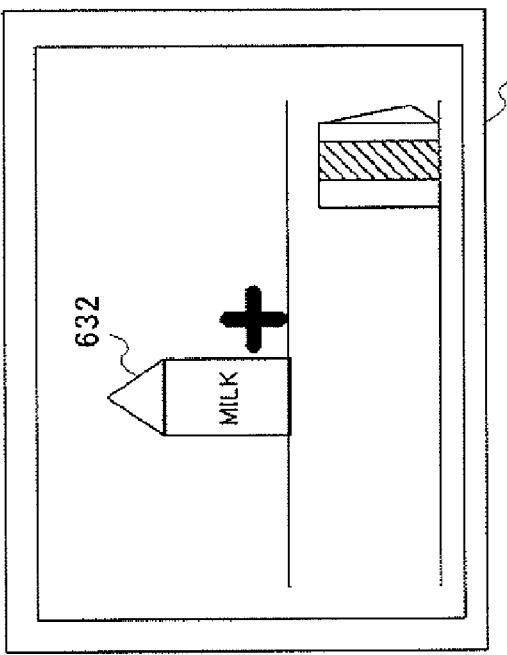
FIG. 21B is a diagram showing an example of a display screen in the camera operation mode.
Figure 21C:
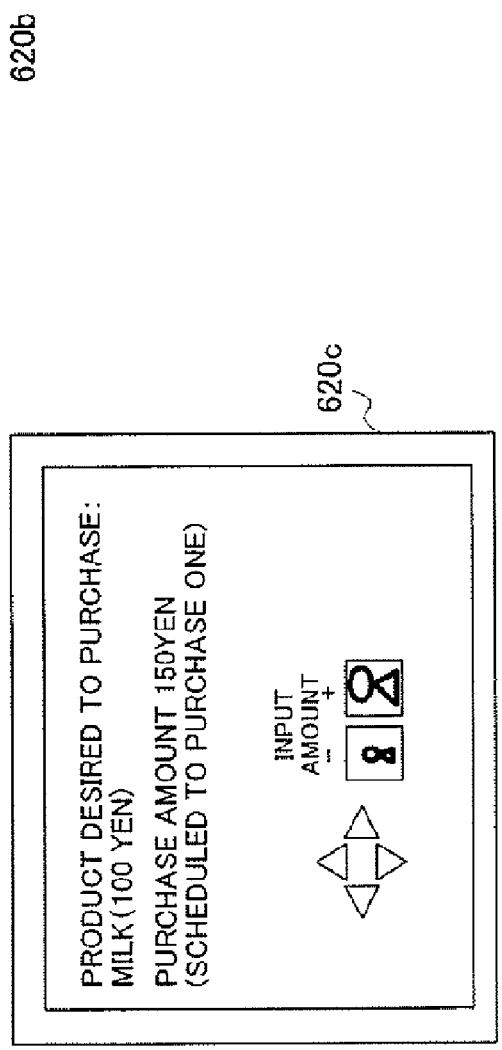
FIG. 21C is a diagram showing an example of a display screen in a state management mode.

FIG. 21 is a diagram illustrating processes for purchasing a product of a store designated by remote control during movement by car. Particularly, FIG. 21A shows display screen 620*a* in the map operation mode to designate a store, FIG. 21B shows display screen 620*b* in the camera operation mode to designate a product desired to purchase, and FIG. 21C shows display screen 620*c* in the state management mode to designate a purchase amount of the product desired to purchase designated in the camera operation mode. In addition, in the figure, "630" denotes an icon representing a store enabling purchase by remote control, while "632" denotes the product desired to purchase.

When a user wants to purchase food or the like by remote control during driving of the car, the user moves operation lever 154 of common operation section 150 to vary a display position of the map while seeing display screen 620*a* (see FIG. 21A) in the map operation mode, and shifts icon 630 of the store enabling purchase by remote control to near the center of the map window.

Then, as in Embodiment 1, when the user pushes zoom button 158 continuously to enlarge the map, the map operation mode is automatically switched to the camera operation mode at the time a value of the scale of the map exceeds a threshold, and display screen 620*b* in FIG. 21B is displayed.

Next, the user moves operation lever 154 of common operation section 150 to vary the shooting direction of the camera so as to select a product desired to purchase, and shifts the product desired to purchase to near the center of the image window.

Then, as in Embodiment 1, when the user pushes zoom button 158 continuously to increase the shooting magnification of the camera, the camera operation mode is automatically switched to the state management mode at the time the shooting magnification exceeds a threshold, and display screen 620*c* in FIG. 21C is displayed.

Next, when the user pushes zoom button 158 of common operation section 150 to determine the number of products desired to purchase and to finally determine whether or not to purchase the product, the purchase amount increases, and the user is capable of purchasing the product in the case where the purchase amount exceeds unit price of the product desired to purchase.

Further, by moving operation lever 154, the user is capable of changing the product desired to purchase. Meanwhile, when the operation is not performed for a predetermined time, a check screen is displayed to check with the user for a final decision on whether or not to purchase the product.

The state management mode is switched to the camera operation mode when the user actually purchases the product or when the user pushes wide button 156 continuously and the purchase amount decreases and falls below zero. Meanwhile, as in Embodiment 1, the camera operation mode is switched to the map operation mode when the user pushes wide button 156 continuously and the shooting magnification of the camera becomes "1" (the widest-angle state) or less.

Thus, according to this Embodiment, the camera operation and management of the state in a range shot by the camera is switched automatically using the shooting magnification of the camera, the purchase amount contained in the state management and the like, and it is thereby possible to implement the camera operation and state management using the same operation means, and to perform the operation with a small number of buttons through intuition.

In addition, this Embodiment describes the case of purchasing a product as state management as an example, but the invention is not limited thereto. For example, when a television (TV) exists in a range shot by the camera, the camera operation mode may be automatically switched to a device state management (TV viewing) mode at the time the shooting magnification exceeds a threshold after the user pushes the zoom button continuously, or the TV viewing mode may be automatically switched to the camera operation mode at the time the sound level reaches zero or less after the user pushes the wide button continuously. At this point, the operation lever in the device state management mode may be assigned to channel operation or operation of an HDD recorder connected to the TV.

Further, as well as the home appliance such as the TV and the like, a robot connected on the network may be operated. For example, when a robot exists in a range shot by the camera, the camera operation mode may be shifted to a robot state management mode at the time the shooting magnification exceeds a threshold after the user pushes the zoom button continuously, so that the image data shot by the camera selected in the map operation mode is automatically switched to the image shot by the camera mounted on the robot.

Meanwhile, the robot state management mode may be automatically switched to the camera operation mode at the time the shooting magnification becomes "1" (the widest-angle state) or less after the user pushes the wide button continuously. At this point, the operation lever in the robot state management mode may be assigned to a function of controlling the movement direction and/or posture of the robot.

The present application is based on Japanese Patent Applications No. 2094-205157 filed on Jul. 12, 2004, and No. 2005-189008 filed on Jun. 28, 2005, entire contents of which are expressly incorporated by reference herein.

INDUSTRIAL APPLICABILITY

The surveillance device according to the present invention has the effect of being operated easily even when the surveillance device has a plurality of cameras, and is useful in controlling a plurality of cameras in wide-area surveillance such as town surveillance where a large number of cameras are installed onto the streets, a surveillance device comprised of only a conventionally used console, and the like.

Further, the surveillance device of the invention enables selection of a sight spot and/or famous store in which cameras are installed from the map to check the store and/or purchase the product, and thus is applicable to the fields of car navigation and the like.

The invention claimed is:

1. A camera control device, comprising:
a plurality of cameras;
a camera controller that controls the plurality of cameras and transfers image data from the plurality of cameras;
a map controller that controls and transmits map data indicating installation positions of the plurality of cameras;
an operation manager that automatically switches, according to a predetermined condition, between a camera operation for instructing a change of a shooting magnification of the plurality of cameras and a map operation for instructing a change of a display magnification of the map data;

a common operator that performs the map operation and the camera operation; and a display that displays the image data transmitted from the camera controller and the map data transmitted from the map controller, wherein:

the common operator comprises a first operator and a second operator;

the first operator performs decreasing the shooting magnification in the camera operation and decreasing the display magnification in the map operation; and the second operator performs increasing the shooting magnification in the camera operation and increasing the display magnification in the map operation.

2. The camera control device according to claim 1, wherein the operation manager switches between the camera operation and the map operation corresponding to the shooting magnification of an operation target camera targeted for the camera operation and the display magnification of the map data.

3. The camera control device according to claim 1, wherein the operation manager switches between the camera operation and the map operation corresponding to a number of icons indicating installation positions of cameras existing within an area displaying the map data on a screen of the display.

4. The camera control device according to claim 1, wherein the operation manager switches between the camera operation and the map operation corresponding to a display position of the map data and a scale of a map.

5. The camera control device according to claim 1, wherein the operation manager stores the time of operation by the common operator, and switches between the camera operation and the map operation corresponding to the operation time.

6. The camera control device according to claim 1, wherein the operation manager stores operation procedures of the common operator, and switches between the camera operation and the map operation corresponding to the operation procedures.

7. The camera control device according to claim 1, wherein the operation manager includes a section that transmits an operation mode signal for distinguishing between the map operation and the camera operation, and the camera control device further has a display switch which switches between the image data transmitted from the camera controller and the map data transmitted from the map controller corresponding to the operation mode signal, and which displays one of the image data and the map data in the display.

8. The camera control device according to claim 7, further comprising:

an operation signal transmitter that transmits the operation signal input from the common operator;

an operation signal receiver that receives the operation signal to transmit to the operation manager;

an image signal transmitter that transmits the image data input from the display switch as an image signal; and an image signal receiver that receives the image signal to transmit to the display, wherein the common operator, the display, the operation signal transmitter, and the image signal receiver are provided in a single terminal device.

9. The camera control device according to claim 1, further comprising:

a display controller that reduces the image data transmitted from the camera controller to superimpose and display on the map data transmitted from the map controller.

10. The camera control device according to claim 1, further comprising:

an alarm detector that detects an alarm signal from each of various sensors, wherein the operation manager switches between the camera operation and the map operation corresponding to the alarm signal detected by the alarm detector.

11. The camera control device according to claim 1, further comprising:

a state manager that manages a purchase state of a product within a range shot by a camera, wherein the operation manager switches between the camera operation, the map operation and state management operation for instructing the purchase state of the product in the range shot by the camera corresponding to a state signal from the state manager.

12. The camera control device according to claim 1, further comprising:

a state manager that manages a state of a device within a range shot by a camera, wherein the operation manager switches between the camera operation, the map operation and state management operation for instructing a state of the device in the range shot by the camera corresponding to a state signal from the state manager.

13. A camera control device, comprising:

a plurality of cameras;

a camera controller that controls the plurality of cameras and transfers image data from the plurality of cameras;

a map controller that controls and transmits map data indicating installation positions of the plurality of cameras;

an operation manager that switches between camera operation for instructing operation conditions of the plurality of cameras and map operation for instructing a display condition of the map data;

a common operator that performs the map operation and the camera operation; and a display that displays the image data transmitted from the camera controller and the map data transmitted from the map controller, wherein the operation manager includes a section that transmits an operation mode signal for distinguishing between the map operation and the camera operation, and the camera control device further has a display switch which switches between the image data transmitted from the camera controller and the map data transmitted from the map controller corresponding to the operation mode signal, and which displays one of the image data and the map data in the display.

14. The camera control device according to claim 13, further comprising:

an operation signal transmitter that transmits the operation signal input from the common operator;

an operation signal receiver that receives the operation signal to transmit to the operation manager;

an image signal transmitter that transmits the image data input from the display switch as an image signal; and an image signal receiver that receives the image signal to transmit to the display, wherein the common operator, the display, the operation signal transmitter, and the image signal receiver are provided in a single terminal device.

15. A camera control device, comprising:

a plurality of cameras;

a camera controller that controls the plurality of cameras and transfers image data from the plurality of cameras;

a map controller that controls and transmits map data indicating installation positions of the plurality of cameras;

an operation manager that switches between camera operation for instructing operation conditions of the plurality of cameras and map operation for instructing a display condition of the map data;

a common operator that performs the map operation and the camera operation;

a display that displays the image data transmitted from the camera controller and the map data transmitted from the map controller; and an alarm detector that detects an alarm signal from each of various sensors, wherein the operation manager switches between the camera operation and the map operation corresponding to the alarm signal detected by the alarm detector.

* * * * *